United States Patent
Yang et al.

(10) Patent No.: US 10,129,873 B2
(45) Date of Patent: Nov. 13, 2018

(54) NON-CONTIGUOUS CHANNEL ALLOCATION AND BONDING FOR WIRELESS COMMUNICATION NETWORKS

(71) Applicant: QUALCOMM Incorporated, San Diego, CA (US)

(72) Inventors: Lin Yang, San Diego, CA (US); Bin Tian, San Diego, CA (US); Youhan Kim, San Jose, CA (US); Sameer Vermani, San Diego, CA (US); Jialing Li Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 15/092,449

(22) Filed: Apr. 6, 2016

(65) Prior Publication Data

US 2016/0302200 A1    Oct. 13, 2016

Related U.S. Application Data

(60) Provisional application No. 62/144,838, filed on Apr. 8, 2015, provisional application No. 62/157,421, filed (Continued)

(51) Int. Cl.
  *H04W 72/04* (2009.01)
  *H04L 5/00* (2006.01)
  *H04L 1/00* (2006.01)

(52) U.S. Cl.
  CPC ....... *H04W 72/0446* (2013.01); *H04L 1/0041* (2013.01); *H04L 5/001* (2013.01); *H04L 5/0037* (2013.01); *H04L 5/0044* (2013.01)

(58) Field of Classification Search
  CPC .. H04W 72/0446; H04L 5/001; H04L 5/0037; H04L 5/0044; H04L 1/0041
  See application file for complete search history.

(56) References Cited

U.S. PATENT DOCUMENTS

| 8,462,709 B2 | 6/2013 | Nanda et al. |
| 2006/0120473 A1 | 6/2006 | Baum et al. |

(Continued)

FOREIGN PATENT DOCUMENTS

| EP | 2363987 A1 | 9/2011 |
| EP | 2665217 A1 | 11/2013 |

OTHER PUBLICATIONS

International Search Report and Written Opinion—PCT/US2016/026500—ISA/EPO—dated Jun. 30, 2016

(Continued)

*Primary Examiner* — Walli Butt
(74) *Attorney, Agent, or Firm* — Knobbe, Martens, Olson & Bear, LLP

(57) ABSTRACT

Methods and apparatuses can be disclosed for communicating over a wireless communication network. One communication device includes a processor configured to allocate, or receive allocation of, at least a portion of a first sub-band of a channel and at least a portion of a second sub-band of the channel for use by the communication device. The communication device further includes a plurality of encoders configured to independently encode first and second data for wireless transmission over the first and second sub-bands, respectively. The communication device further includes a transmitter configured to transmit the independently encoded first and second data over the first and second sub-bands, respectively.

26 Claims, 14 Drawing Sheets

Related U.S. Application Data on May 5, 2015, provisional application No. 62/309,367, filed on Mar. 16, 2016.

(56) References Cited

U.S. PATENT DOCUMENTS

| | | |
|---|---|---|
| 2010/0002675 A1 | 1/2010 | Fu et al. |
| 2011/0003608 A1 | 1/2011 | Forenza et al. |
| 2011/0211541 A1* | 9/2011 | Yuk .................. H04L 5/001 370/329 |
| 2012/0082045 A1 | 4/2012 | Liu et al. |
| 2013/0301555 A1* | 11/2013 | Porat .................. H04L 1/0059 370/329 |
| 2015/0146653 A1* | 5/2015 | Zhang .................. H04L 5/0041 370/329 |
| 2015/0381330 A1* | 12/2015 | Chen .................. H04L 5/0046 370/329 |
| 2017/0223693 A1* | 8/2017 | Kim .................. H04W 72/0406 370/329 |
| 2017/0273083 A1 | 9/2017 | Chen et al. |
| 2017/0273106 A1* | 9/2017 | Chatterjee ............. H04L 5/0032 |

OTHER PUBLICATIONS

Khorov E., et al., "IEEE 802.11ax: How to Build High Efficiency WLANs", 2015 International Conference on Engineering and Telecommunication (ENT), IEEE, Nov. 18, 2015 (Nov. 18, 2015), pp. 14-19, XP032875338, DOI: 10.1109/ENT.2015.23 [retrieved on Feb. 26, 2016].

* cited by examiner

| Bandwidth | 20MHz | | 40MHz | | 80MHz | |
|---|---|---|---|---|---|---|
| FFT Size | 256 | | 512 | | 1024 | |
| # of TAUs x Tones/TAU | 9x26 | 1x242 | 19x26 | 18x26 | 2x242 | 38x26 | 36x26 | 4x242 |
| # of tones for allocation | 234 | 242 | 494 | 468 | 484 | 988 | 936 | 968 |
| # of DC+guard+leftover | 22 | 14 | 18 | 44 | 28 | 36 | 88 | 56 |

FIG. 4

NON-CONTIGUOUS CHANNEL ALLOCATION AND BONDING FOR WIRELESS COMMUNICATION NETWORKS

PRIORITY CLAIM

This application claims the benefit of U.S. Provisional Application No. 62/144,838, filed Apr. 8, 2015; U.S. Provisional Application No. 62/157,421, filed May 5, 2015; and U.S. Provisional Application No. 62/309,367, filed Mar. 16, 2016, each of which is hereby incorporated herein by reference in its entirety.

FIELD

Certain aspects of the present disclosure generally relate to wireless communications, and more particularly, to methods and apparatuses for allocating and bonding wireless communication channels.

BACKGROUND

In many telecommunication systems, communications networks can be used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks can be often preferred when the network elements can be mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

The devices in a wireless network can transmit/receive information between each other. Device transmissions can interfere with each other, and certain transmissions can selectively block other transmissions. Where many devices can be a communication network, congestion and inefficient link usage can result. As such, systems, methods, and non-transitory computer-readable media can be needed for improving communication efficiency in wireless networks.

SUMMARY

Various implementations of systems, methods and devices within the scope of the appended claims each have several aspects, no single one of which can be solely responsible for the desirable attributes described herein. Without limiting the scope of the appended claims, some prominent features can be described herein.

Details of one or more implementations of the subject matter described in this specification can be set forth in the accompanying drawings and the description below. Other features, aspects, and advantages will become apparent from the description, the drawings, and the claims. Note that the relative dimensions of the following figures may not be drawn to scale.

One aspect of the present disclosure provides a communication device configured to communicate over a wireless communication network. The communication device includes a processor configured to allocate, or receive allocation of, at least a portion of a first sub-band of a channel and at least a portion of a second sub-band of the channel for concurrent use by the communication device. The communication device further includes a plurality of encoders configured to independently encode first and second data for wireless transmission over the first and second sub-bands, respectively. The communication device further includes a transmitter configured to transmit the independently encoded first and second data over the first and second sub-bands, respectively.

In various embodiments, the first sub-band can include a plurality of tone blocks each including 26, 52, 106, or 242 tones. In various embodiments, the communication device can be allocated a first tone block of the plurality of tone blocks in the first sub-band, and a second communication device can be allocated a second tone block of the plurality of tone blocks in the first sub-band. In various embodiments, the first sub-band can be a 20 MHz, 40 MHz, 80 MHz, or 160 MHz portion of the channel, and the second sub-band can be a 20 MHz, 40 MHz, 80 MHz, or 160 MHz portion of the channel.

In various embodiments, the first sub-band can be non-contiguous with the second sub-band in the channel. In various embodiments, the first sub-band can be contiguous with the second sub-band in the channel and the first sub-band has a resource allocation separate from the second sub-band. In various embodiments, the communication device can further include plurality of fast Fourier transform (FFT) units configured to separately perform FFT on the first and second sub-band.

In various embodiments, the first sub-band can be contiguous with the second sub-band, and the transmission on the first sub-band can include a separate physical layer data unit (PPDU) from the transmission on the second sub-band. In various embodiments, the first sub-band can be non-contiguous with the second sub-band, and the processor can be further configured to choose a combination of non-contiguous sub-bands from two options. In various embodiments, the first sub-band can be separated from the second sub-band by at least one null sub-band.

In various embodiments, the first sub-band can be contiguous with the second sub-band, and the first and second sub-bands together can include a single-user uplink or downlink transmission including a combination of 802.11ax physical layer data units (PPDUs). In various embodiments, wherein the first sub-band can be contiguous with the second sub-band, and the first and second sub-bands together can include an uplink or downlink orthogonal frequency-division multiple access (OFDMA) transmission comprises a combination of two 802.11ax or 802.11ax plus legacy transmissions. In various embodiments, the channel can further include at least one null sub-band, and the processor can be further configured to puncture a tone plan for the null sub-band without regard for a boundary between the null sub band and the first or second sub-bands.

In various embodiments, the channel can further include at least one null sub-band, and the processor can be further configured to create a guard band, between the null sub band and the first or second sub-bands, by puncturing one or more data tones next to the null sub-band such that sub-band boundaries are respected. In various embodiments, the null sub-band can be adjacent to a set of direct current (DC) tones for the channel, and the processor can be further configured to puncture only one half of a 26-tone allocation unit.

In various embodiments, the null sub-band can be non-adjacent to a set of direct current (DC) tones for the channel, and the processor can be further configured to puncture an entire 26-tone allocation unit. In various embodiments, the first sub-band can include a first 80 MHz segment, the second sub-band can include a second 80 MHz segment, and the processor can be further configured to disallow single-user transmission mode. In various embodiments, the processor can be further configured to disallow use of one or more 802.11 transmission protocols over the channel during transmission of the independently encoded first and second data.

In various embodiments, the processor can be further configured to disallow uplink transmissions over the channel during transmission of the independently encoded first and second data. In various embodiments, the processor can be configured to establish an alternate primary channel via media access control signaling during transmission of the independently encoded first and second data. In various embodiments, the processor can be further configured to allocate a frequency gap between two frequency division multiple access (FDMA) physical layer convergence protocol (PLCP) protocol data units (PPDUs) during transmission of the independently encoded first and second data.

Another aspect provides a method of communicating over a wireless communication network. The method includes allocating, or receiving allocation of, at least a portion of a first sub-band of a channel and at least a portion of a second sub-band of the channel for concurrent use by a communication device. The method further includes independently encoding first and second data for wireless transmission over the first and second sub-bands, respectively. The method further includes transmitting the independently encoded first and second data over the first and second sub-bands, respectively.

In various embodiments, the first sub-band can include a plurality of tone blocks each including 26, 52, 106, or 242 tones. In various embodiments, the communication device can be allocated a first tone block of the plurality of tone blocks in the first sub-band, and a second communication device can be allocated a second tone block of the plurality of tone blocks in the first sub-band. In various embodiments, the first sub-band can be a 20 MHz, 40 MHz, 80 MHz, or 160 MHz portion of the channel, and the second sub-band can be a 20 MHz, 40 MHz, 80 MHz, or 160 MHz portion of the channel.

In various embodiments, the first sub-band can be non-contiguous with the second sub-band in the channel. In various embodiments, the first sub-band has a different resource allocation from the second sub-band. In various embodiments, the method can further include separately performing a Fast Fourier Transform on the first and second sub-band. In various embodiments, the first sub-band can be contiguous with the second sub-band, and the transmission on the first sub-band can include a separate physical layer data unit (PPDU) from the transmission on the second sub-band.

Another aspect provides a non-transitory computer readable medium. The medium includes code that, when executed, causes an apparatus to allocate, or receive allocation of, at least a portion of a first sub-band of a channel and at least a portion of a second sub-band of the channel for concurrent use by a communication device. The medium further includes code that, when executed, causes the apparatus to independently encode first and second data for wireless transmission over the first and second sub-bands, respectively. The medium further includes code that, when executed, causes the apparatus to transmit the independently encoded first and second data over the first and second sub-bands, respectively.

Another aspect provides an apparatus for communicating over a wireless communication network. The apparatus includes means for allocating, or receiving allocation of, at least a portion of a first sub-band of a channel and at least a portion of a second sub-band of the channel for concurrent use by a communication device. The apparatus further includes means for independently encoding first and second data for wireless transmission over the first and second sub-bands, respectively. The apparatus further includes means for transmitting the independently encoded first and second data over the first and second sub-bands, respectively.

BRIEF DESCRIPTION OF THE DRAWINGS

FIG. 4 is an illustration of a 20 MHz, a 40 MHz, and an 80 MHz transmission.

DETAILED DESCRIPTION

Figure 1:
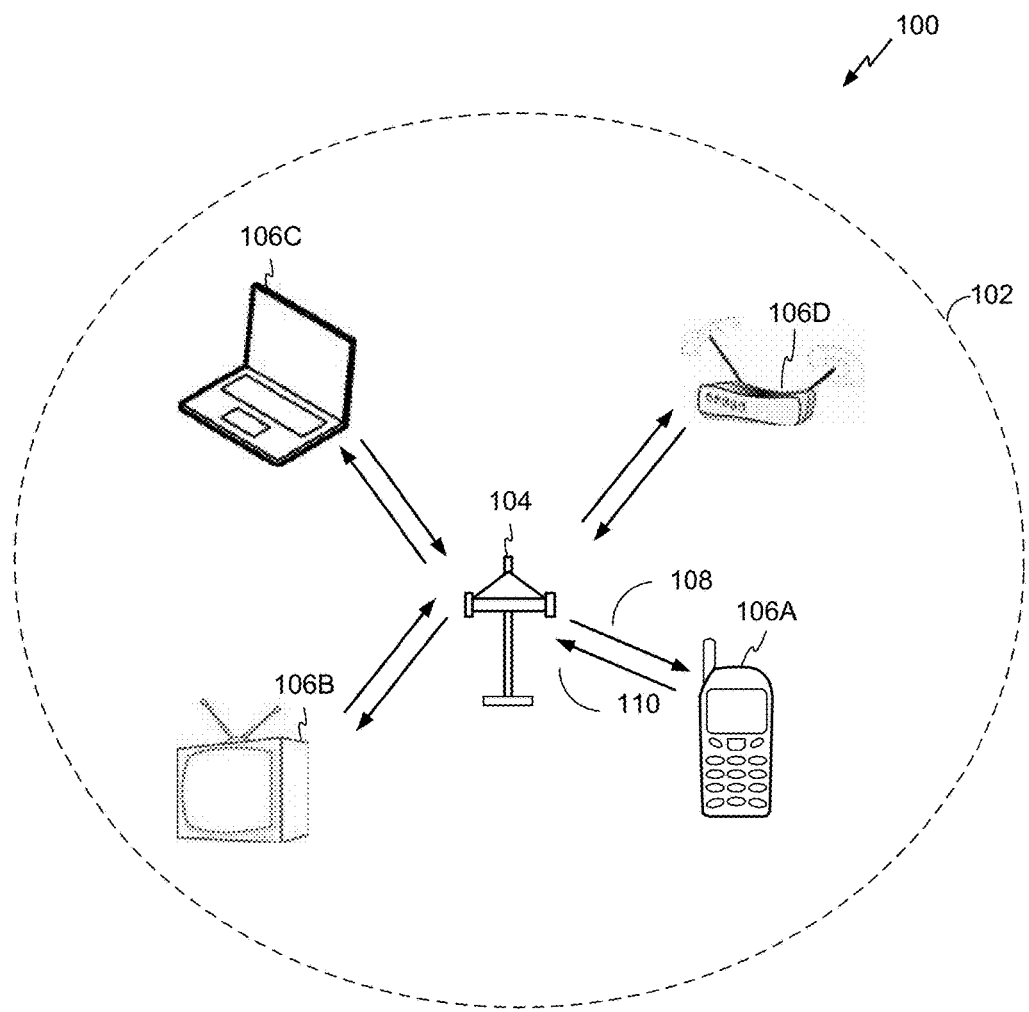
FIG. 1 illustrates an example of a wireless communication system in which aspects of the present disclosure can be employed.

Various aspects of the novel systems, apparatuses, and methods can be described more fully hereinafter with reference to the accompanying drawings. The teachings of this disclosure can, however, be embodied in many different forms and should not be construed as limited to any specific structure or function presented throughout this disclosure. Rather, these aspects can be provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects can be described herein, many variations and permutations of these aspects fall within the scope of the disclosure. Although some benefits and advantages of the preferred aspects can be mentioned, the scope of the disclosure is not intended to be limited to particular benefits, uses, or objectives. Rather, aspects of the disclosure can be intended to be broadly applicable to different wireless technologies, system configurations, networks, and transmission protocols, some of which can be illustrated by way of example in the figures and in the following description of the preferred aspects. The detailed description and drawings can be merely illustrative of the disclosure rather than limiting, the scope of the disclosure being defined by the appended claims and equivalents thereof.

Implementing Devices

Wireless network technologies can include various types of wireless local area networks (WLANs). A WLAN can be used to interconnect nearby devices together, employing widely used networking protocols. The various aspects described herein can apply to any communication standard, such as Wi-Fi or, more generally, any member of the IEEE 802.11 family of wireless protocols.

In some aspects, wireless signals can be transmitted according to a high-efficiency 802.11 protocol using orthogonal frequency-division multiplexing (OFDM), direct-sequence spread spectrum (DSSS) communications, a combination of OFDM and DSSS communications, or other schemes.

In some implementations, a WLAN includes various devices which can be the components that access the wireless network. For example, there can be two types of devices: access points ("APs") and clients (also referred to as stations, or "STAs"). In general, an AP serves as a hub or base station for the WLAN and an STA serves as a user of the WLAN. For example, an STA can be a laptop computer, a personal digital assistant (PDA), a mobile phone, etc. In an example, an STA connects to an AP via a Wi-Fi (e.g., IEEE 802.11 protocol such as 802.11ax) compliant wireless link to obtain general connectivity to the Internet or to other wide area networks. In some implementations an STA can also be used as an AP.

The techniques described herein can be used for various broadband wireless communication systems, including communication systems that can be based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system can utilize sufficiently different directions to concurrently transmit data belonging to multiple user terminals. A TDMA system can allow multiple user terminals to share the same frequency channel by dividing the transmission signal into different time slots, each time slot being assigned to different user terminal. A TDMA system can implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers can also be called tones, bins, etc. With OFDM, each sub-carrier can be independently modulated with data. An OFDM system can implement IEEE 802.11 or some other standards known in the art. An SC-FDMA system can utilize interleaved FDMA (IFDMA) to transmit on sub-carriers that can be distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols can be sent in the frequency domain with OFDM and in the time domain with SC-FDMA. A SC-FDMA system can implement 3GPP-LTE (3rd Generation Partnership Project Long Term Evolution) or other standards.

The teachings herein can be incorporated into (e.g., implemented within or performed by) a variety of wired or wireless apparatuses (e.g., nodes). In some aspects, a wireless node implemented in accordance with the teachings herein can comprise an access point or an access terminal.

An access point ("AP") can comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") can also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure can be employed. The wireless communication system 100 can operate pursuant to a wireless standard, for example the 802.11ax standard. The wireless communication system 100 can include an AP 104, which communicates with STAs 106.

A variety of processes and methods can be used for transmissions in the wireless communication system 100 between the AP 104 and the STAs 106. For example, signals can be transmitted and received between the AP 104 and the STAs 106 in accordance with OFDM/OFDMA techniques. If this is the case, the wireless communication system 100 can be referred to as an OFDM/OFDMA system. Alternatively, signals can be transmitted and received between the AP 104 and the STAs 106 in accordance with CDMA techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer network between the STAs 106. Accordingly, the functions of the AP 104 described herein can alternatively be performed by one or more of the STAs 106.

Figure 2:
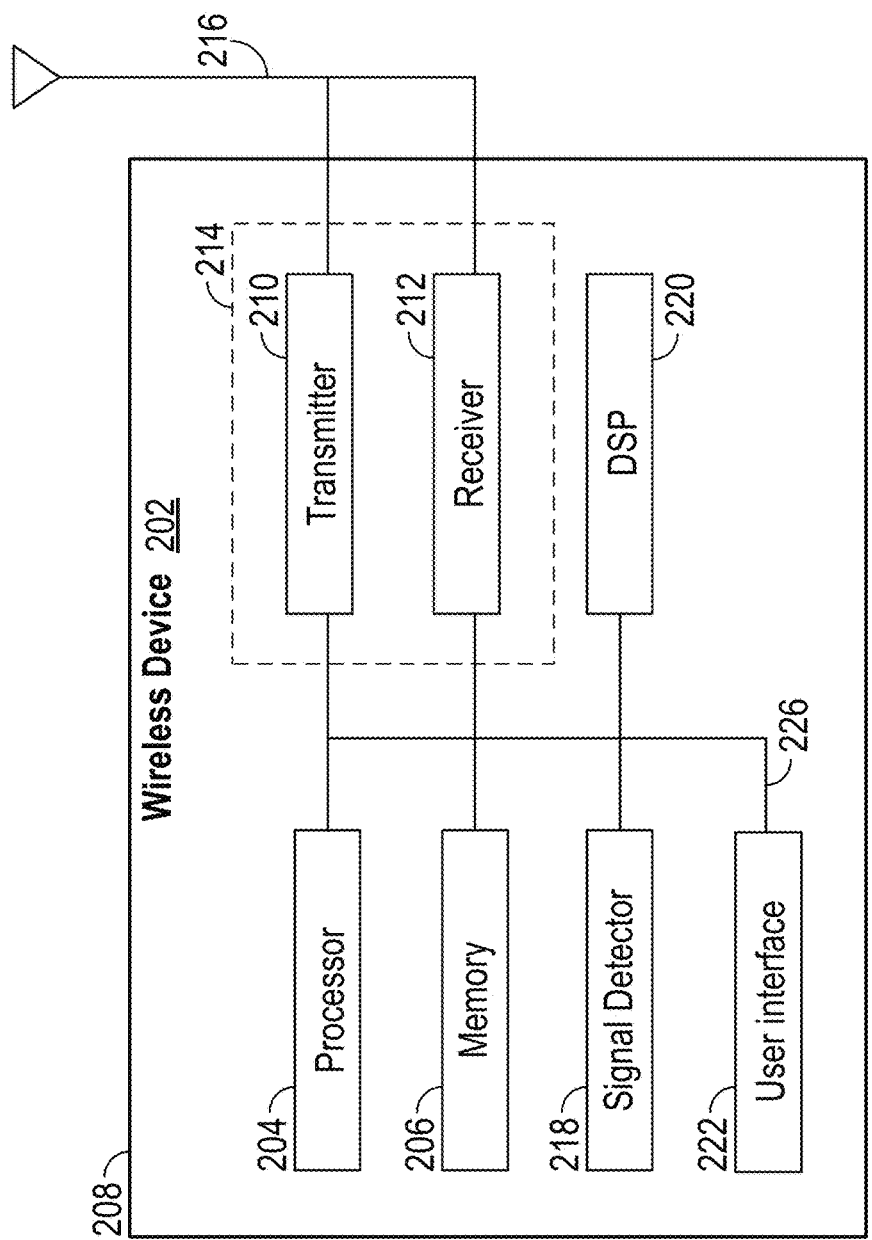
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can comprise the AP 104 or one of the STAs 106.

The wireless device 202 can include a processor 204 which controls operation of the wireless device 202. The processor 204 can also be referred to as a central processing unit (CPU). Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during MIMO communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can comprise a physical layer data unit (PPDU). In some aspects, the PPDU is referred to as a packet.

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components can be illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can comprise an AP 104 or an STA 106, and can be used to transmit and/or receive communications. The communications exchanged between devices in a wireless network can include data units which can comprise packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

Certain aspects of the present disclosure support allowing APs 104 to allocate STAs 106 transmissions in optimized ways to improve efficiency. Both high efficiency wireless (HEW) stations, stations utilizing an 802.11 high efficiency protocol (such as 802.11ax), and stations using older or legacy 802.11 protocols (such as 802.11b), can compete or coordinate with each other in accessing a wireless medium. In some embodiments, the high-efficiency 802.11 protocol described herein can allow for HEW and legacy stations to interoperate according to various OFDMA tone plans (which can also be referred to as tone maps). In some embodiments, HEW stations can access the wireless medium in a more efficient manner, such as by using multiple access techniques in OFDMA. Accordingly, in the case of apartment buildings or densely-populated public spaces, APs and/or STAs that use the high-efficiency 802.11 protocol can experience reduced latency and increased network throughput even as the number of active wireless devices increases, thereby improving user experience.

In some embodiments, APs 104 can transmit on a wireless medium according to various DL tone plans for HEW STAs. For example, with respect to FIG. 1, the STAs 106A-106D can be HEW STAs. In some embodiments, the HEW STAs can communicate using a symbol duration four times that of a legacy STA. Accordingly, each symbol which is transmitted may be four times as long in duration. When using a longer symbol duration, each of the individual tones may only require one-quarter as much bandwidth to be transmitted. For example, in various embodiments, a 1× symbol duration can be 3.2 ms and a 4× symbol duration can be 12.8 ms. The AP 104 can transmit messages to the HEW STAs 106A-106D according to one or more tone plans, based on a communication bandwidth. In some aspects, the AP 104 may be configured to transmit to multiple HEW STAs simultaneously, using OFDMA.

Efficient Tone Plan Design for Multicarrier Allocation

Figure 3:
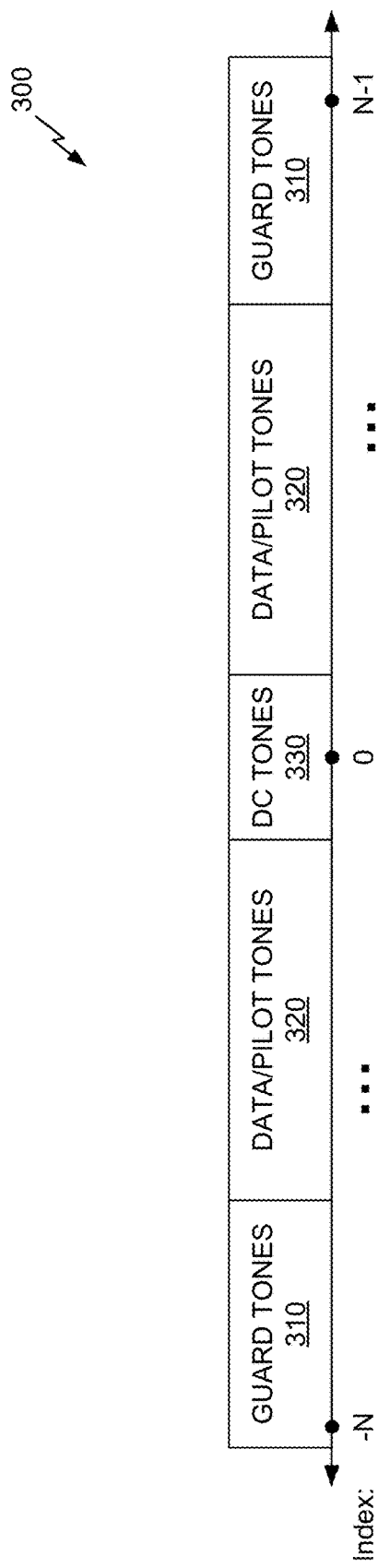
FIG. 3 shows an example 2N-tone plan, according to one embodiment.

FIG. 3 shows an example 2N-tone plan 300, according to one embodiment. In an embodiment, the tone plan 300 corresponds to OFDM tones, in the frequency domain, generated using a 2N-point FFT. The tone plan 300 includes 2N OFDM tones indexed N to N−1. The tone plan 300 includes two sets of edge tones 310, two sets of data/pilot tones 320, and a set of direct current (DC) tones 330. In various embodiments, the edge tones 310 and DC tones 330 can be null. In various embodiments, the tone plan 300 includes another suitable number of pilot tones and/or includes pilot tones at other suitable tone locations.

In some aspects, OFDMA tone plans may be provided for transmission using a 4× symbol duration, as compared to various IEEE 802.11 protocols. For example, 4× symbol duration may use a number of symbols which can be each 12.8 ms in duration (whereas symbols in certain other IEEE 802.11 protocols may be 3.2 ms in duration).

In some aspects, the data/pilot tones 320 of a transmission 300 may be divided among any number of different users. For example, the data/pilot tones 320 may be divided among between one and eight users. In order to divide the data/pilot tones 320, an AP 104 or another device may signal to the various devices, indicating which devices may transmit or receive on which tones (of the data/pilot tones 320) in a particular transmission. Accordingly, systems and methods for dividing the data/pilot tones 320 may be desired, and this division may be based upon a tone plan.

A tone plan may be chosen based on a number of different characteristics. For example, it may be beneficial to have a simple tone plan, which can be consistent across most or all bandwidths. For example, an OFDMA transmission may be transmitted over 20, 40, or 80 MHz, and it may be desirable to use a tone plan that can be used for any of these bandwidths. Further, a tone plan may be simple in that it uses a smaller number of building block sizes. For example, a tone plan may contain a unit which may be referred to as a tone allocation unit (TAU). This unit may be used to assign a particular amount of bandwidth to a particular user. For example, one user may be assigned bandwidth as a number of TAUs, and the data/pilot tones 320 of a transmission may be broken up into a number of TAUs. In some aspects, it may be beneficial to have a single size of TAU. For example, if there were two or more sizes of TAU, it may require more signaling to inform a device of the tones that can be allocated to that device. In contrast, if all tones can be broken up into TAUs of consistent size, signaling to a device may simply require telling a device a number of TAUs assigned to that device. Accordingly, using a single TAU size may reduce signaling and simplify tone allocation to various devices.

A tone plan may also be chosen based on efficiency. For example, transmissions of different bandwidths (e.g., 20, 40, or 80 MHz) may have different numbers of tones. Thus, it may be beneficial to choose a TAU size that leaves fewer tones leftover after the creation of the TAUs. For example, if a TAU was 100 tones, and if a certain transmission included 199 tones, this may leave 99 tones leftover after creating one TAU. Thus, 99 tones may be considered "leftover" tones, and this may be quite inefficient. Accordingly, reducing the number of leftover tones may be beneficial. It may also be beneficial if a tone plan is used which allows for the same tone plan to be used in both UL and DL OFDMA transmissions. Further, it may be beneficial if a tone plan is configured to preserve 20 and 40 MHz boundaries, when needed. For example, it may be desirable to have a tone plan which allows each 20 or 40 MHz portion to be decoded separately from each other, rather than having allocations which can be on the boundary between two different 20 or 40 MHz portions of the bandwidth. For example, it may be beneficial for interference patterns to be aligned with 20 or 40 MHz channels. Further, it may be beneficial to have channel binding, such that when a 20 MHz transmission and a 40 MHz transmission can be transmitted, to create a 20 MHz "hole" in the transmission when transmitted over 80 MHz. This may allow, for example, a legacy packet to be transmitted in this unused portion of the bandwidth. Finally, it may also be advantageous to use a tone plan which provides for fixed pilot tone locations in various different transmissions, such as in different bandwidths.

Generally, a number of different implementations can be presented. For example, certain implementations have been made which include multiple different building blocks, such as two or more different tone units. For example, there may be a basic tone unit (BTU), and a small tone unit (STU), which is smaller than the basic tone unit. Further, the size of the BTU itself may vary based upon the bandwidth of the transmission. In another implementation, resource blocks can be used, rather than tone units. However, in some aspects, it may be beneficial to use a single tone allocation unit TAU for all bandwidths of transmissions in OFDMA.

FIG. 4 is an illustration of a 20 MHz, a 40 MHz, and an 80 MHz transmission. As shown in FIG. 4, each transmission can be formed from a combination of one or more 26-tone TAUs, or one or more 242-tone TAUs. Generally, 26 tones in an IEEE 802.11ax transmission may be transmitted over a bandwidth of 2.03 MHz and 242 tones can be transmitted over a bandwidth of 18.91 MHz. For example, in one implementation, a 20 MHz transmission, having an FFT size of 256, can include 234 allocation tones formed from nine 26-tone TAUs, leaving 22 remaining tones for DC tones, edge tones, and other leftover tones. The 234 allocation tones can be used as data and pilot tones. In another implementation, a 20 MHz transmission, having an FFT size of 256, can include 242 allocation tones formed from one 242-tone TAU, leaving 14 remaining tones for DC tones, edge tones, and other leftover tones. The 242 allocation tones can be used as data and pilot tones.

As another example, in one implementation, a 40 MHz transmission, having an FFT size of 512, can include 494 allocation tones formed from 19 26-tone TAUs, leaving 18 remaining tones for DC tones, edge tones, and other leftover tones. The 494 allocation tones can be used as data and pilot tones. In another implementation, a 40 MHz transmission, having an FFT size of 512, can include 468 allocation tones formed from 18 26-tone TAUs, leaving 44 remaining tones for DC tones, edge tones, and other leftover tones. The 468 allocation tones can be used as data and pilot tones. In another implementation, a 40 MHz transmission, having an FFT size of 512, can include 484 allocation tones formed from two 242-tone TAUs, leaving 28 remaining tones for DC tones, edge tones, and other leftover tones. The 484 allocation tones can be used as data and pilot tones.

As another example, in one implementation, an 80 MHz transmission, having an FFT size of 1024, can include 988 allocation tones formed from 38 26-tone TAUs, leaving 36 remaining tones for DC tones, edge tones, and other leftover tones. The 988 allocation tones can be used as data and pilot tones. In another implementation, an 80 MHz transmission, having an FFT size of 1024, can include 936 allocation tones formed from 36 26-tone TAUs, leaving 88 remaining tones for DC tones, edge tones, and other leftover tones. The 936 allocation tones can be used as data and pilot tones. In another implementation, an 80 MHz transmission, having an FFT size of 1024, can include 968 allocation tones formed from four 242-tone TAUs, leaving 56 remaining tones for DC tones, edge tones, and other leftover tones. The 968 allocation tones can be used as data and pilot tones.

In various embodiments, the location of the 9th 26 tone block for 20 MHz implementations and the $19^{th}$ 26-tone block for 40 MHz implementations, can either cross DC or at the edges. In one embodiment, the last 26-tone block can be distributed around DC when the number of DC+leftover tones is greater than 6. In another embodiment, the last 26-tone block can be distributed at the edges when the number guards tones+leftover tones is greater than 12 20 MHz implementations and greater than 18 for 40 MHz implementations. In an embodiment, the allowed allocation unit size can be limited to reduce the TX mode. In an embodiment, the $19^{th}$ 26-tone TAU (or RU) in 40 MHz can go unused if the allocation unit is 2×26. In an embodiment, the $37^{th}$ and $38^{th}$ 26-tone blocks in 80 MHz implementations can go unused if the allocation unit is 4×26. In some embodiments, 26-tone blocks can be aligned with 242 tone blocks via leftover tones, as will be discussed with respect to FIG. 8. In various embodiments, 242 allocations will not destroy nearby 26-tone block usage. In various embodiments, leftover tones can be used as extra DC tones, guard tones, or as a common or control channel.

As indicated above, a number of tones may be leftover in certain transmissions. These tones can be used for a number of different uses. For example, these tones may be used as additional DC or edge tones. It may be noted here that some illustrated implementations include transmissions having an odd number of TAUs. Because of the odd number of TAUs, one of the TAUs will cross the DC tones (that is, include tones on each side of the DC tones). In other illustrated implementations, an even number of TAUs can be present, so no TAU will cross the DC tones.

In some aspects, if a STA is assigned multiple TAUs, encoding may be performed across all the assigned TAUs. For sub-band OFDMA communications, interleaving may be done in two layers. First, all the bits of a device may be distributed evenly across all TAUs assigned to the device. For example, bits 1, 2, 3, . . . N may be assigned to TAUs 1, 2, 3, . . . N, and so on. Accordingly, each individual TAU may be interleaved within the TAU. Thus, only one size of interleaver may be used, that is, the size of a TAU. In a distributed OFDMA system, interleaving may or may not be needed. In some aspects, a TAU may be chosen, at least in part, based on how many pilot tones may be needed for the TAU. For example, a TAU of 26 may be beneficial in implementations where only two pilot tones per TAU can be used. In implementations where more pilot tones can be used, other TAUs may be used. Generally, when considering the size of a TAU, there is a trade-off between signaling costs, pilot costs, and leftover tones. For example, when smaller TAUs can be used, the number of pilot tones needed (compared to the number of data tones) may increase as a proportion of the total number of tones in a TAU. Further, when smaller TAUs can be used, signaling may require more data to transmit, since there will be a higher total number of TAUs which must be allocated to various devices in an OFDMA transmission. However, as larger TAUs can be used, there can be potentially more leftover tones, which may reduce overall throughput for a given bandwidth and be inefficient.

Figure 5A:
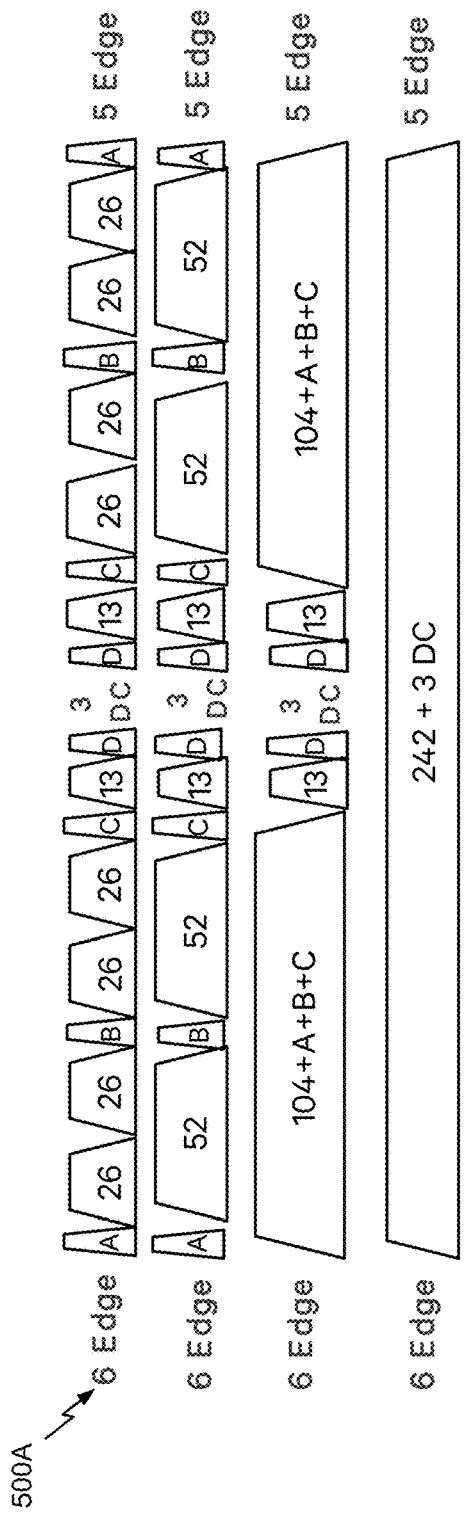
FIGS. 5A-5C show example 20 MHz, 40 MHz, and 80 MHz transmissions using 26-, 52-, 106-, and/or 242-tone allocations, according to various embodiments.
Figure 5B:
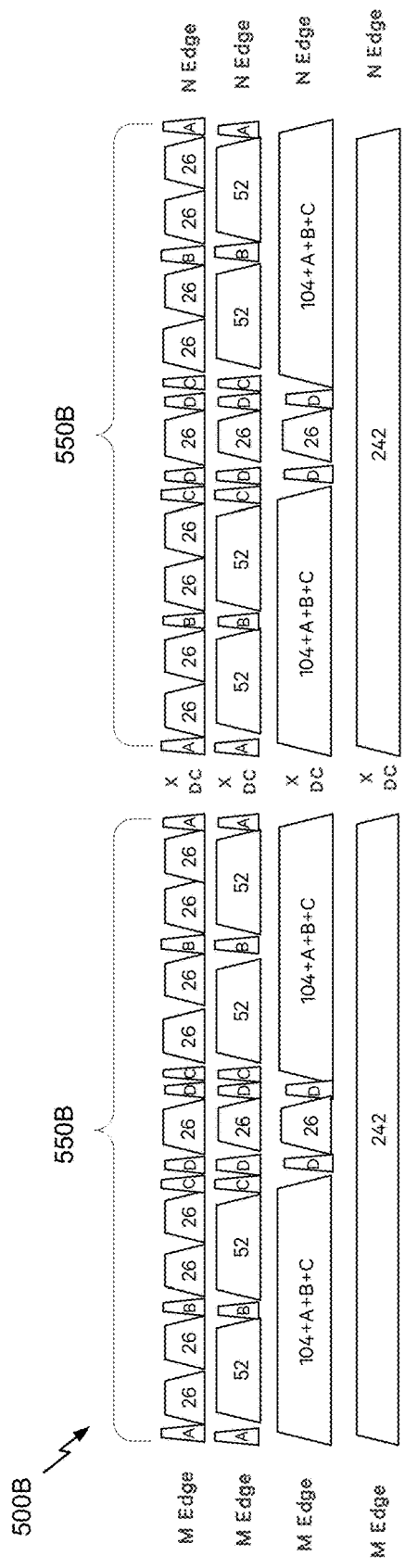
Figure 5C:
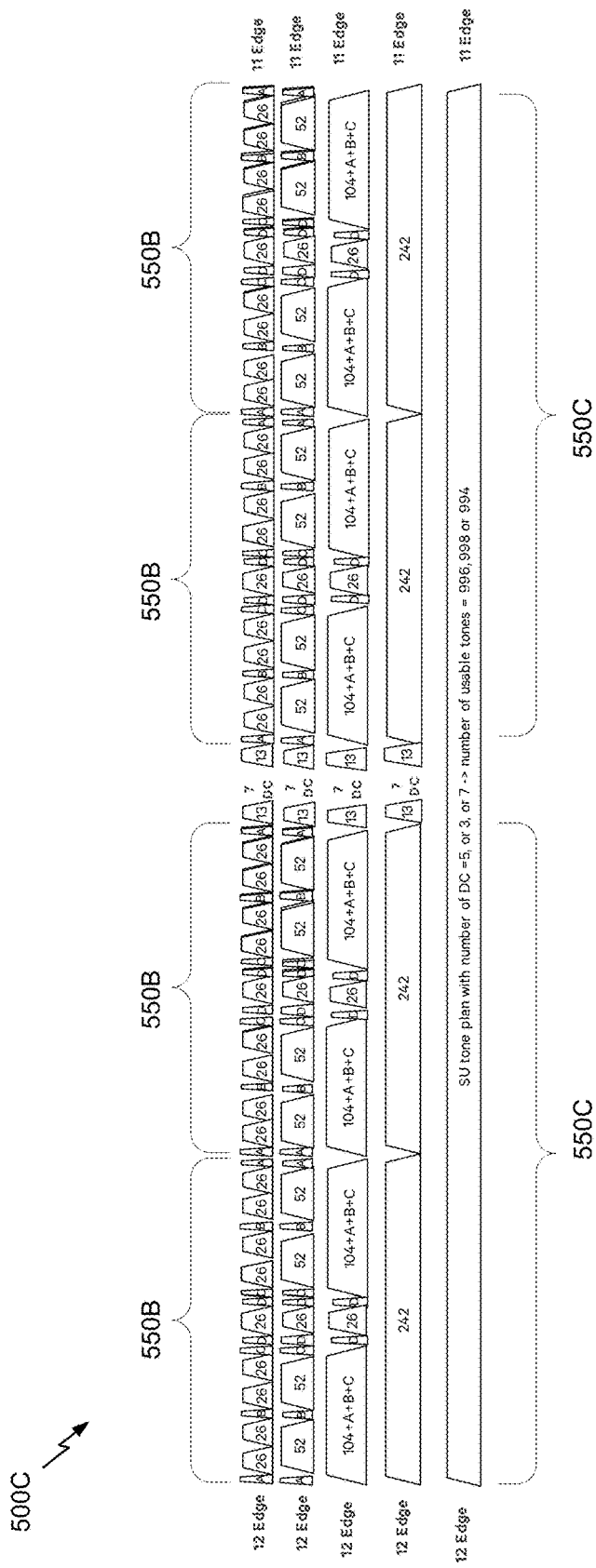

FIGS. 5A-5C show example 20 MHz, 40 MHz, and 80 MHz transmissions using 26-, 52-, 106-, and/or 242-tone allocations, according to various embodiments. The transmissions 500A have 6 left edge tones, 3 DC tones, and 5 right edge tones, and a total of 242 usable tones. Although FIG. 5A shows four example transmissions 500A using various combinations of 26-, 52-, 106-, and 242-tone blocks, allocations within any given transmission can include multiple tone blocks of different sizes, having different arrangements, in various embodiments.

The first of the illustrated transmissions 500A includes nine 26-tone blocks (with one 26-tone block being divided into two 13-tone portions), 6 left edge tones, 5 right edge tones, 2*A outer leftover tones, 2*B middle leftover tones, 2*C inner leftover tones, 3 DC tones, and 2*D additional DC tones. In various embodiments, D can be 0, 1, or 2, for a total of 3, 5, or 7 total DC tones. As discussed herein, leftover tones can variously be used as edge tones, DC tones, control tones, and the like.

The second of the illustrated transmissions 500A includes four 52-tone blocks, one 26-tone block being divided into two 13-tone portions, 6 left edge tones, 5 right edge tones, 2*A outer leftover tones, 2*B middle leftover tones, 2*C inner leftover tones, 3 DC tones, and 2*D additional DC tones. In various embodiments, D can be 0, 1, or 2, for a total of 3, 5, or 7 total DC tones. As discussed herein, leftover tones can variously be used as edge tones, DC tones, control tones, and the like.

The third of the illustrated transmissions 500A includes two blocks having 104+A+B+C tones, one 26-tone block being divided into two 13-tone portions, 6 left edge tones, 5 right edge tones, 3 DC tones, and 2*D additional DC tones. In various embodiments, D can be 0, 1, or 2, for a total of 3, 5, or 7 total DC tones. In various embodiments, A+B+C+D can be equal to 4, giving the tone blocks having 104+A+B+C tones a total of 106, 107, or 108 tones. In embodiments including a 106-tone block, the 106-tone block can include 102 data tones and 5 pilot tones. In embodiments including a 107-tone block, the 106-tone block can include 102 data tones and 4 pilot tones. As discussed herein, leftover tones can variously be used as edge tones, DC tones, control tones, and the like.

The fourth of the illustrated transmissions 500A includes a single 242-tone block having 3 DC tones, 6 left edge tones, 5 right edge tones.

FIG. 5B shows example 40 MHz transmissions 500B, which can be organized in the same manner as the 40 MHz transmission 600A-D of FIGS. 6A-D, with the addition of additional and/or leftover tones labeled A-D. The transmissions 500B have M left edge tones, X DC tones, and N right edge tones, and a total of 484 usable tones. In various embodiments, A+B+C+D can be equal to 4. In various embodiments, D can be 0, 1, or 2. In various embodiments, X can be 3, 5, or 7. In embodiments where X is 5, M can be equal to 12 and N can be equal to 11. In embodiments where X is 7, M can be equal to 11 and N can be equal to 10.

Although FIG. 5B shows four example transmissions 500B using various combinations of 26-, 52-, 106-, and 242-tone blocks, allocations within any given transmission can include multiple tone blocks of different sizes, having different arrangements, in various embodiments. In the illustrated embodiment, each 40 MHz transmission 500B is a duplicate of two 20 MHz transmissions 550B, which in various embodiments can be the 20 MHz transmissions 500A of FIG. 5A or any other 20 MHz transmission discussed herein.

The first of the illustrated transmissions 500B includes two 20 MHz portions 550B each including nine 26-tone blocks, 2*A outer leftover tones, 2*B middle leftover tones, 2*C inner leftover tones, and 2*D additional inner leftover tones. As discussed herein, leftover tones can variously be used as edge tones, DC tones, control tones, and the like.

The second of the illustrated transmissions 500B includes two 20 MHz portions 550B each including four 52-tone blocks, one 26-tone block, 2*A outer leftover tones, 2*B middle leftover tones, 2*C inner leftover tones, and 2*D additional inner leftover tones. As discussed herein, leftover tones can variously be used as edge tones, DC tones, control tones, and the like.

The third of the illustrated transmissions 500B includes two 20 MHz portions 550B each including two blocks having 104+A+B+C tones, one 26-tone block, and D leftover tones on each side of the 26-tone block. In various embodiments, A+B+C+D can be equal to 4, giving the tone blocks having 104+A+B+C tones a total of 106, 107, or 108 tones. In embodiments including a 106-tone block, the 106-tone block can include 102 data tones and 5 pilot tones. In embodiments including a 107-tone block, the 106-tone block can include 102 data tones and 4 pilot tones. As discussed herein, leftover tones can variously be used as edge tones, DC tones, control tones, and the like.

The fourth of the illustrated transmissions 500B includes two 20 MHz portions 550B. Each 20 MHz portion 550B includes a single 242-tone block.

FIG. 5C shows example 80 MHz transmissions 500C. The transmissions 500C have 12 left edge tones, 7 DC tones, and 11 right edge tones, and a total of 994 usable tones for OFDMA, and a total of 994, 996, or 998 usable tones for whole BW allocation with reduced number of DC tones being 7, or 5, or 3. In various embodiments, A+B+C+D can be equal to 4. In various embodiments, D can be 0, 1, or 2.

Although FIG. 5C shows five example transmissions 500C using various combinations of 26-, 52-, 106-, and 242-tone blocks, allocations within any given transmission can include multiple tone blocks of different sizes, having different arrangements, in various embodiments. In the illustrated embodiment, each 80 MHz transmission 500C is a duplicate of four 20 MHz transmissions 550B, which in various embodiments can be the 20 MHz transmissions 500A of FIG. 5A or any other 20 MHz transmission discussed herein. Additionally or alternatively, each 80 MHz transmission 500C is a duplicate of two 40 MHz transmissions 550C, which in various embodiments can be the 40 MHz transmissions 500B of FIG. 5B or any other 40 MHz transmission discussed herein. In the illustrated embodiment, each 80 MHz transmission 500C further includes an additional 26-tone block divided into two separate 13-tone portions on either side of the 7 DC tones.

The first of the illustrated transmissions 500C includes four 20 MHz portions 550B each including nine 26-tone blocks, 2*A outer leftover tones, 2*B middle leftover tones, 2*C inner leftover tones, and 2*D additional inner leftover tones. The first of the illustrated transmissions 500C further includes an additional 26-tone block divided into two separate 13-tone portions on either side of the 7 DC tones. As discussed herein, leftover tones can variously be used as edge tones, DC tones, control tones, and the like.

The second of the illustrated transmissions 500C includes four 20 MHz portions 550B each including four 52-tone blocks, one 26-tone block, 2*A outer leftover tones, 2*B middle leftover tones, 2*C inner leftover tones, and 2*D additional inner leftover tones. The second of the illustrated transmissions 500C further includes an additional 26-tone block divided into two separate 13-tone portions on either side of the 7 DC tones. As discussed herein, leftover tones can variously be used as edge tones, DC tones, control tones, and the like.

The third of the illustrated transmissions 500C includes four 20 MHz portions 550B each including two blocks having 104+A+B+C tones, one 26-tone block, and D leftover tones on each side of the 26-tone block. In various embodiments, A+B+C+D can be equal to 4, giving the tone blocks having 104+A+B+C tones a total of 106, 107, or 108 tones. In embodiments including a 106-tone block, the 106-tone block can include 102 data tones and 5 pilot tones. In embodiments including a 107-tone block, the 106-tone block can include 102 data tones and 4 pilot tones. The third of the illustrated transmissions 500C further includes an additional 26-tone block divided into two separate 13-tone portions on either side of the 7 DC tones. As discussed herein, leftover tones can variously be used as edge tones, DC tones, control tones, and the like.

The fourth of the illustrated transmissions 500C includes four 20 MHz portions 550B. Each 20 MHz portion 550B includes a single 242-tone block. The fourth of the illustrated transmissions 500C further includes an additional 26-tone block divided into two separate 13-tone portions on either side of the 7 DC tones.

The fifth of the illustrated transmissions 500C includes a single-user tone plan having 3, 5, or 7 DC tones in various embodiments. Accordingly, the SU tone plan can include 996, 998, or 994 usable tones, respectively.

Non-Contiguous and Fractional Bandwidth

Figure 7:
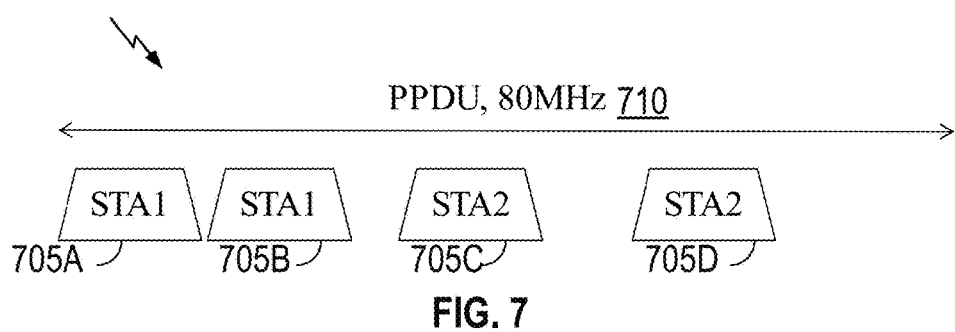
FIG. 7 shows an example 80 MHz transmission including four RUs for two user' allocations, according to one embodiment.

As discussed above, the AP 104 can allocate one or more RUs or TAUs to each STA 106. In some embodiments, such allocations can be contiguous within the bandwidth of each transmission. In other embodiments, the allocations can be non-contiguous. For example, non-adjacent RUs can be allocated to the same STA 106, as shown in FIG. 7.

Although various transmissions can be referred to herein as sub-bands, a person having ordinary skill in the art will appreciate, that in some embodiments, sub-bands can be referred to as bands or channels. As used herein, "BSS BW"

can refer to bandwidth setup for use in a particular BSS, for example an entire channel. "PPDU BW" can refer to bandwidth of a particular PPDU being transmitted. For example, the AP 104 (FIG. 1) can set up a BSS having 80 MHz BSS BW. Within the 80 MHz BSS BW, STAs 106A-106D can transmit on 20+40 MHz allocations due to interference in the null SB of the secondary channel. Thus, for FDMA packets, PPDU BW of a first packet can be 20 MHz, and PPDU BW of a second packet can be 40 MHz. For OFDMA packets, PPDU BW of a single packet can be 20+40 MHz.

Figure 6A:
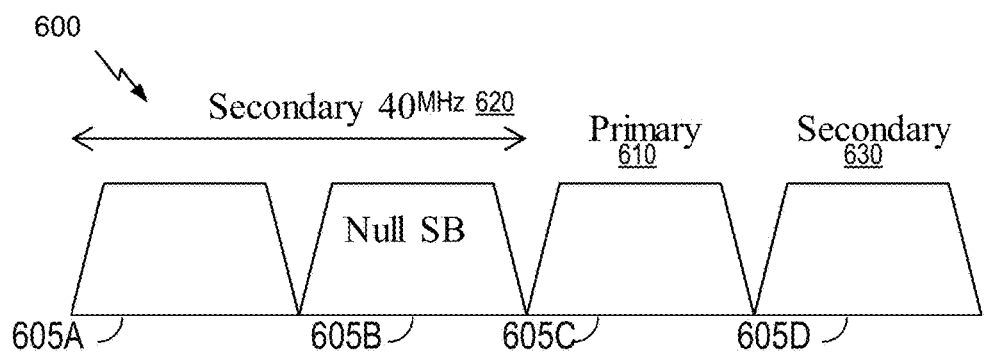
FIG. 6A shows an example 80 MHz transmission with non-contiguous channel bonding, according to one embodiment.

FIG. 6A shows an example 80 MHz transmission 600 with non-contiguous channel bonding. The transmission 600 includes four 20 MHz sub-bands 605A-605D, according to one embodiment. Although FIG. 6A shows one example 80 MHz transmission 600, other transmission sizes can be used, sub-bands can be added, omitted, rearranged, reallocated, or resized in various embodiments. For example, in various embodiments, the teachings of transmission 600 can be applied to any of the tone plans or transmission discussed herein.

As shown in FIG. 6A, the transmission 600 includes a primary channel 610, and secondary channels 620 and 630. The secondary channel 620 includes a null sub-band 605B, which is not allocated for transmission. Accordingly, non-contiguous sub-bands 605A, 605C, and 605D can be used for transmission. In some embodiments, the transmission 600 can be referred to as a 20+40 MHz transmission, wherein the sub-band 605A can include 20 MHz, and the sub-bands 605C-605D each comprise 20 MHz totaling 40 MHz. In some embodiments, non-contiguous sub-bands 605A, 605C, and 605D can be allocated to the same STA, for example the STA 106A.

In other embodiments, sub-bands can be contiguous, but can comprise only a strict subset of entire channel bandwidth. Such transmissions can be referred to as fractional transmissions or fractional allocations. One such example fractional transmission is shown in FIG. 6B.

Figure 6B:
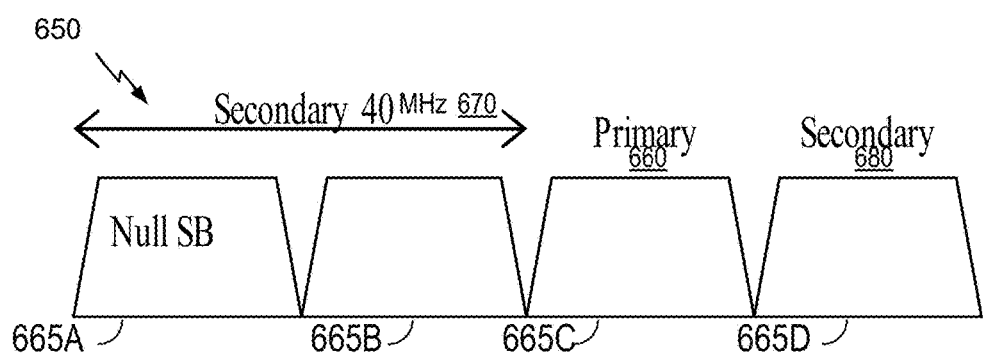
FIG. 6B shows an example 80 MHz transmission with fractional channel bonding, according to one embodiment.

FIG. 6B shows an example 80 MHz transmission 600 with fractional channel bonding. The transmission 650 includes four 20 MHz sub-bands 655A-655D, according to one embodiment. Although FIG. 6B shows one example 80 MHz transmission 650, other transmission sizes can be used, sub-bands can be added, omitted, rearranged, reallocated, or resized in various embodiments. For example, in various embodiments, the teachings of transmission 650 can be applied to any of the tone plans or transmission discussed herein.

As shown in FIG. 6B, the transmission 650 includes a primary channel 660, and secondary channels 670 and 680. The secondary channel 670 includes a null sub-band 655A, which is not allocated for transmission. Accordingly, contiguous sub-bands 655B, 655C, and 655D can be used for transmission. In some embodiments, the transmission 650 can be referred to as a 60 MHz transmission, wherein the sub-bands 605B-605D each comprise 20 MHz totaling 60 MHz. Similar fractional and/or non-contiguous allocations can be applied to other channel bandwidths, for example as shown in FIG. 6C.

Figure 6C:
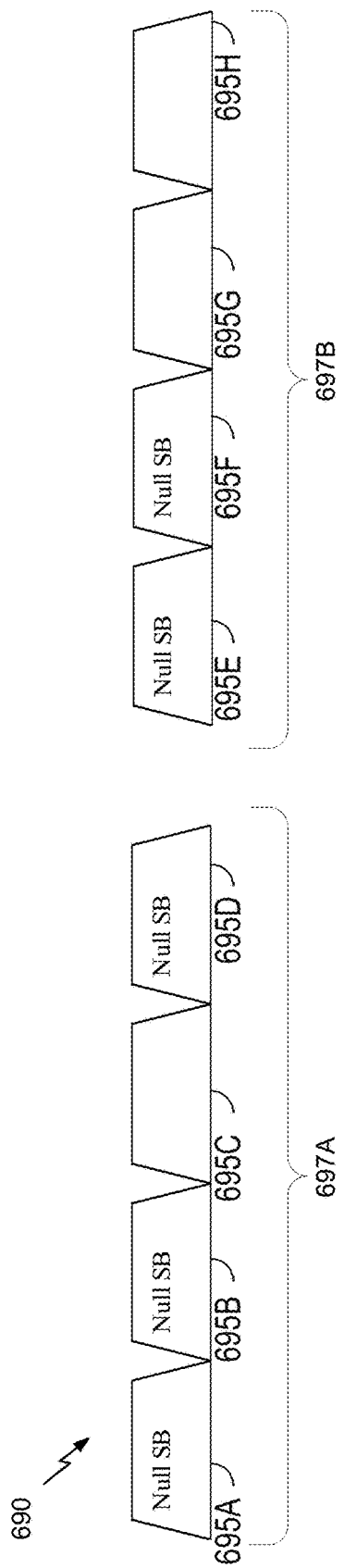
FIG. 6C shows an example 160 MHz transmission with fractional channel bonding, according to one embodiment.

FIG. 6C shows an example 160 MHz transmission 690 with fractional channel bonding. The illustrated transmission 690 includes two 80 MHz segments 697A-697B, each including four 20 MHz sub-bands 695A-695D and 695E-695H, respectively. Although FIG. 6C shows one example 80+80 MHz transmission 690, other transmission sizes can be used, sub-bands can be added, omitted, rearranged, reallocated, or resized in various embodiments. For example, in various embodiments, the teachings of transmission 690 can be applied to any of the tone plans or transmission discussed herein.

As shown in FIG. 6C, the transmission 690 includes null sub-bands 695Am 695B, 695D, 695E, and 695F, which can be not allocated for transmission. Accordingly, sub-band 695C and contiguous sub-bands 695G-695H can be used for transmission. In some embodiments, the transmission 690 can be referred to as a 20+40 MHz transmission, wherein the sub-band 695C is 20 MHz, and sub-bands 695G-695H each include 20 MHz totaling 40 MHz.

Ignoring Sub-Band Boundary for Fractional Channels

As discussed above with respect to FIGS. 6A-6C fractional or non-contiguous channel allocation is available in a variety of BSS BWs including 80, 160, and 80+80 MHz. Although a variety of PHY modes can be contemplated herein, certain modes can be preferred according to various parameters.

In one embodiment, the AP 104 (or another device discussed herein) can ignore a sub-band (e.g., 20 MHz) boundary next to a null sub-band and can be configured to puncture the tone plan for the null sub-band. Such configuration can increase or maximize throughput within available PPDU BW. In some embodiments, ignoring the sub-band boundary can increase adjacent channel interference (ACI) due to reduced or eliminated guard tones. One example of 20 MHz physical boundaries is shown in FIG. 12.

Figure 12:
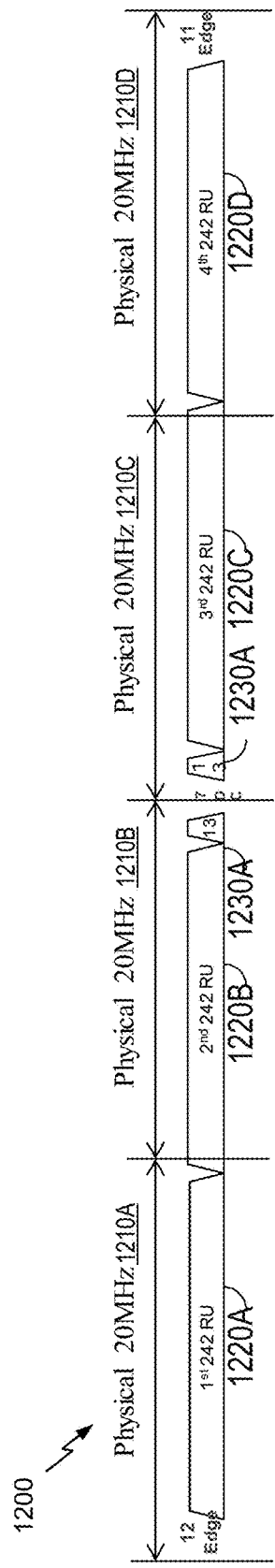
FIG. 12 shows an example 80 MHz transmission, including a plurality of physical 20 MHz boundaries.

FIG. 12 shows an example 80 MHz transmission 1200 including a plurality of physical 20 MHz boundaries. The transmission 1200 is organized in the same manner as the fourth 80 MHz transmission 500C of FIG. 5C. The transmission 1200 has 12 left edge tones, 7 DC tones, and 11 right edge tones, and a nominal total of 994 usable tones for OFDMA.

Although FIG. 12 shows an example transmission 1200 using one combination of 26- (split into two 13-) and 242-tone blocks, allocations within any given transmission can include multiple tone blocks of different sizes, having different arrangements, in various embodiments. In the illustrated embodiment, the 80 MHz transmission 1200 is a duplicate of four 20 MHz sub-bands 1210A-1210D.

The first 242-tone block 1220A is shifted 2 tones away from a 20 MHz boundary. The second 242-tone block 1220B includes 2 tones crossing a 20 MHz boundary. The 7 DC tones can be split into 3+4 tones across a 20 MHz boundary (and can serve as guard bands to the 20 MHz boundary in some embodiments. The third 242-tone block 1220C includes 3 tones crossing a 20 MHz boundary. The fourth 242-tone block 1220D is shifted 3 tones away from a 20 MHz boundary.

In embodiments where sub-band boundaries can be ignored, null sub-bands can be punctured from the tone plan, and those tones that belong to an RU close to a sub-band boundary (such as the illustrated 20 MHz boundary) will still be transmitted rather than being repurposed as edge tones. On the other hand, in some embodiments, sub-band boundaries can be respected, as discussed in greater detail below.

Respecting Sub-Band Boundary for Fractional Channels

In another embodiment, the AP 104 (or another device discussed herein) can respect a sub-band (e.g., 20 MHz) boundary next to a null sub-band and can be configured to create a guard band from one or more data tones (for example, via puncturing) next to the null sub-band. Such configuration can reduce adjacent channel interference (ACI) via the increased guard tones. In some embodiments, the addition of such guard tones can decrease throughput.

In some embodiments, when a null sub-band is next to DC tones (for example, 80 MHz DC tones), only half of a 26-tone allocation can be punctured. In other embodiments, where no null sub-band is next to DC tones (for example, 80 MHz DC tones), an entire 26-tone allocation can be punctured. In various embodiments, tones crossing a physical sub-band boundary (for example, the physical 20 MHz boundaries shown in FIG. 12) can be punctured for guard/edge tones.

As discussed above, for 80 MHz BSS BWs, the AP 104 (or another device discussed herein) can either respect or ignore sub-band boundaries for fractional and/or non-contiguous channels. Similarly, for OFDMA transmissions on fractional channels within a contiguous 160 MHz BSS BW, the AP 104 (or another device discussed herein) can either respect or ignore sub-band boundaries for fractional and/or non-contiguous channels in the same manner discussed above.

Moreover, when null sub-bands can be present in 80+80 MHz BSS BWs (for example, 20+40 MHz configurations, etc.), single-user transmission mode can be disallowed. In other words, the AP 104 can refrain from authorizing single-user transmission. For OFDMA transmissions in fractional 80+80 MHz BSS BWs, the AP 104 (or another device discussed herein) can either respect or ignore sub-band boundaries for fractional and/or non-contiguous channels in the same manner discussed above. In some embodiments, the same user is not allocated to different segments of the BSS BW, unless in single-user mode.

Independent Encoding in Contiguous Channel Bonding

As discussed above, the allocations can be contiguous or non-contiguous in various embodiments. In either case, in some embodiments, multiple RUs allocated to the same STA can be independently encoded. For example, contiguous RUs can be allocated to a first STA, and non-contiguous RUs can be allocated to a second STA, as shown in FIG. 7. In various embodiments herein, independent encoding can refer to at least the use of separate encoders to produce separate outputs for each sub-channel or RU in parallel, the use of a single encoder to produce separate outputs for each sub-channel or RU serially, encodings where the content of one sub-channel does not change the output of encoding for another sub-channel, or any combination thereof.

FIG. 7 shows an example 80 MHz transmission 700 including four RUs 705A-705D for two user's allocations, according to one embodiment. Although FIG. 7 shows one example 80 MHz transmission 700, other transmission sizes can be used, RUs can be added, omitted, rearranged, reallocated, or resized in various embodiments. For example, in various embodiments, the teachings of transmission 700 can be applied to any of the tone plans or transmission discussed herein.

As shown in FIG. 7, the transmission 700 includes a PPDU 710. Within the PPDU 710, contiguous RUs 705A-705B can be allocated to a STA1, which in some embodiments can be the STA 106A of FIG. 1. Non-contiguous RUs 705C-705D can be allocated to a STA2, which in some embodiments can be the STA 106B of FIG. 1. Each of the RUs 705A-705B allocated to STA1 can be encoded independently from each other. Likewise, each of the RUs 705C-70D allocated to STA2 can be encoded independently from each other. In various embodiments, each of the RUs 705A-705D can include any combination of tone blocks discussed herein, for example, the 26-, 52-, 106-, 107-, 108- and/or 242-tone blocks. Moreover, in some embodiments, other tone block sizes can be contemplated such as, for example, 102-tone blocks.

In various embodiments, in UL OFDMA embodiments, the AP 104 receives all packets. For example, the AP 104 can receive the PPDU 710 from the STA1 and the STA2. In some embodiments, the AP 104 transmits the PPDU 710 in a DL OFDMA mode.

Independent PPDUs for Non-Contiguous Channels

As discussed above, in some embodiments, all RUs 705A-705D can be included in the same PPDU 710. In other embodiments, non-contiguous channels can be transmitted and received as separate PPDUs, as shown in FIG. 8.

Figure 8:
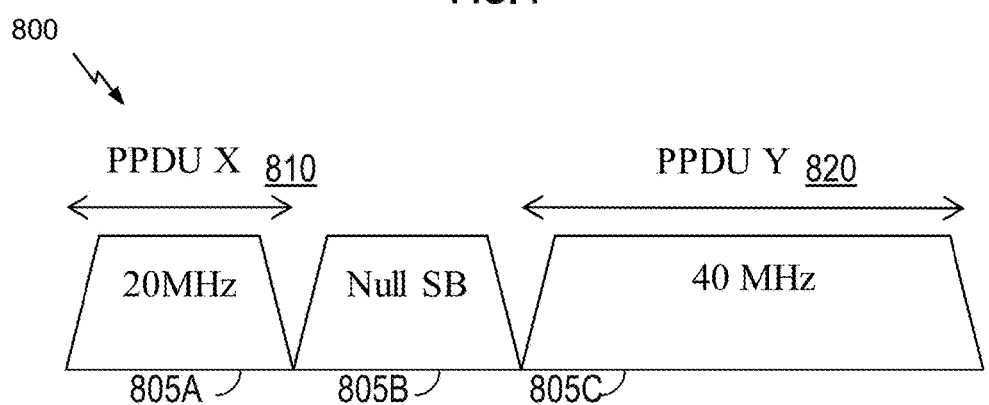
FIG. 8 shows an example 80 MHz transmission including two transmissions in frequency division multiplexing (FDM) manner, according to one embodiment.

FIG. 8 shows an example 80 MHz transmission 800 including two transmissions in FDM manner, according to one embodiment. The transmission 800 includes three sub-bands 805A-805C. Although FIG. 8 shows one example 80 MHz transmission 800, other transmission sizes can be used, sub-bands can be added, omitted, rearranged, reallocated, or resized in various embodiments. For example, in various embodiments, the teachings of transmission 800 can be applied to any of the tone plans or transmission discussed herein.

As shown in FIG. 8, the transmission 800 includes a first PPDU X 810 and a second PPDU Y 820. The first PPDU X 810 includes a 20 MHz sub-band 805A. A null sub-band 805B separates the first PPDU X 810 and the second PPDU Y 820. The second PPDU Y 820 includes a 40 MHz sub-band 805C. Accordingly, the sub-bands 805A and 805C can be non-contiguous.

In various embodiments, separate resource allocation can be done on different sub-band. In various embodiments, different sub-bands can include different tone plans. Merely as an example, the 20 MHz sub-band 805A can be scheduled to one group of users, while the 40 MHz sub-band 805C can be scheduled to another group of users. In some embodiments, the 242-tone block boundary may not be aligned with a physical 20 MHz boundary. Accordingly, in some embodiments, separate FFTs can be used for each sub-band 805A and 805C, for example in embodiments where sub-bands can be far apart. In various embodiments herein, separate FFTs can refer to at least the use of separate processors to produce outputs from distinct input data for each sub-channel or RU in parallel, the use of a single processor produce outputs from distinct input data for each sub-channel or RU serially, transformations where the content of one sub-channel does not change the output of the FFT for another sub-channel, or any combination thereof.

In various embodiments, each sub-band 805A and 805C can include an independent PPDU. For example, the sub-band 805A can include a 1× legacy PPDU. At the same time, the sub-band 805C can include a 4× 802.11ax PPDU.

In various embodiments, the number of non-contiguous modes can be reduced or limited. For example, the AP 104 can restrict combinations of non-contiguous BWs and/or limit the non-contiguous bands to a limit (for example, 2). In other embodiments, the AP 104 can limit combinations of non-contiguous BWs to those non-contiguous bands separated by a pre-defined null sub-band.

DL/UL Support for Non-Contiguous Channel Bonding

In some embodiments, the transmission 800 of FIG. 8 can include a DL SU transmission. In DL SU embodiments, transmissions can include pairs of X+Y PPDUs, for example where X and Y PPDUs can be defined in the 802.11ax standard and can be transmitted in an OFDM/FDM manner. For example, X+Y can include 20+40 PPDUs, 20+20 PPDUs, 40+40 PPDUs, and so on.

In some embodiments, the transmission 800 of FIG. 8 can include an UL SU transmission. In UL SU embodiments, transmissions can include pairs of X+Y PPDUs, for example where X and Y PPDUs can be defined in the 802.11ax and/or 802.11 ac standard and can be transmitted in an OFDM/FDM manner. For example, X+Y can include 20+40 PPDUs, 20+20 PPDUs, 40+40 PPDUs, 80+80 PPDUs, and so on.

In some embodiments, the transmission 800 of FIG. 8 can include a DL OFDMA/FDMA transmission. In DL OFDMA/FDMA embodiments, transmissions can include two separate OFDMA transmissions each addressed to a different group of users, or example where X and Y PPDUs can be defined in the 802.11ax and/or legacy standards. For example, X+Y can include 11ax+legacy PPDUs, 11ax+11ax PPDUs, 80+80 legacy PPDUs, and so on.

In some embodiments, the transmission 800 of FIG. 8 can include an UL OFDMA/FDMA transmission. In UL OFDMA/FDMA embodiments, transmissions can include pairs of X+Y PPDUs, where X and Y PPDUs can be defined in the 802.11ax and/or legacy standards. In some embodiments where both X and Y can be 802.11ax PPDUs, any RU/BW size is contemplated.

Figure 9:
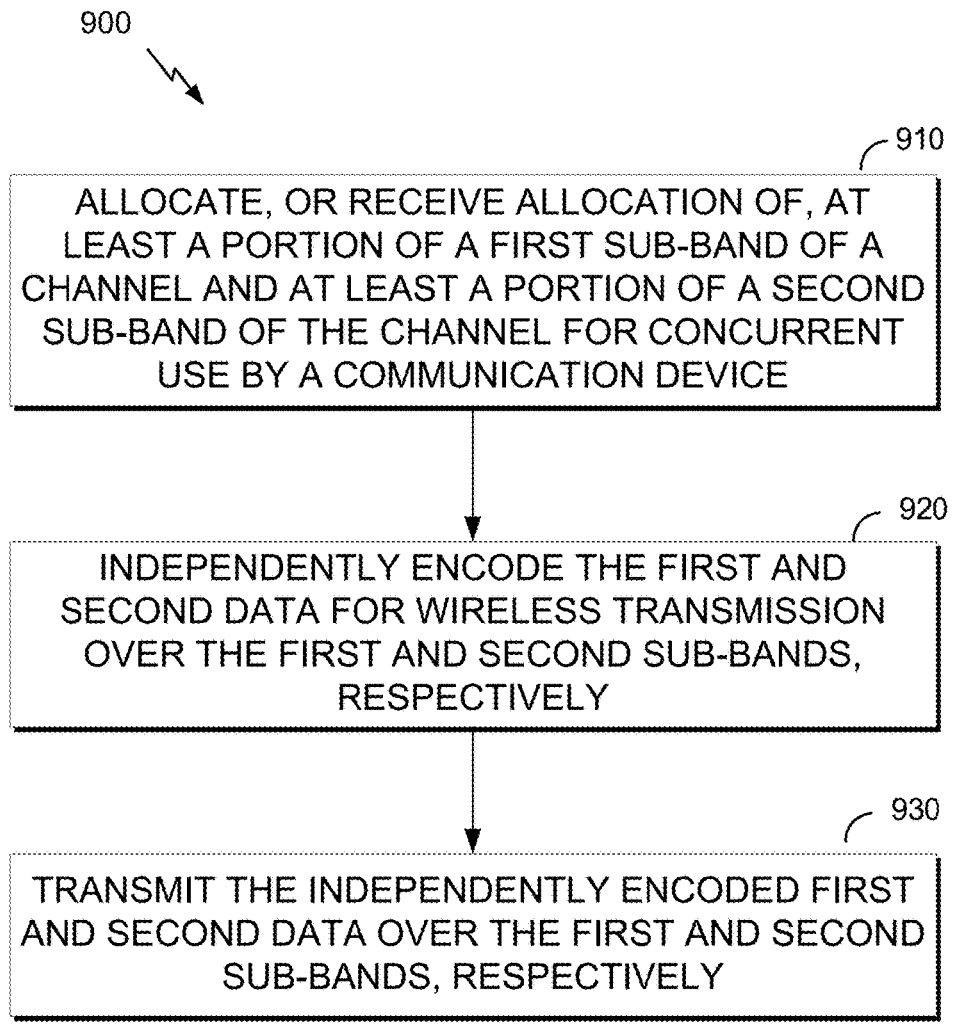
FIG. 9 shows a flowchart for another example method of communicating over a wireless communication network.

FIG. 9 shows a flowchart 900 for an example method of communicating over a wireless communication network. The method may be used to allocate and bond contiguous or non-contiguous resource allocations to one or more wireless devices. The method can be implemented in whole or in part by the devices described herein, such as the wireless device 202 shown in FIG. 2 or the AP 104 shown in FIG. 1. Although the illustrated method is described herein with reference to the wireless communication system 100 discussed above with respect to FIG. 1, and the transmissions 500A-800 discussed above with respect to FIGS. 5A-8, a person having ordinary skill in the art will appreciate that the illustrated method can be implemented by another device or transmission described herein, or any other suitable device or transmission. Although the illustrated method is described herein with reference to a particular order, in various embodiments, blocks herein can be performed in a different order, or omitted, and additional blocks can be added.

At block 910, a wireless device allocates, or receives allocation of, at least a portion of a first sub-band of a channel and at least a portion of a second sub-band of the channel for concurrent use by the communication device. For example, in some embodiments the AP 104 can allocate one or more sub-bands 805A and 805C to STAs 106A and 106C, respectively. In other embodiments, the STAs 106A and 106C can receive such allocations. Accordingly, in various embodiments the communication device can include the AP 104 or any STA 106A-106C. In various aspects, means for allocating can include the processor 204 (FIG. 2). In various aspects, means for receiving can include the receiver 212 (FIG. 2).

Figure 11:
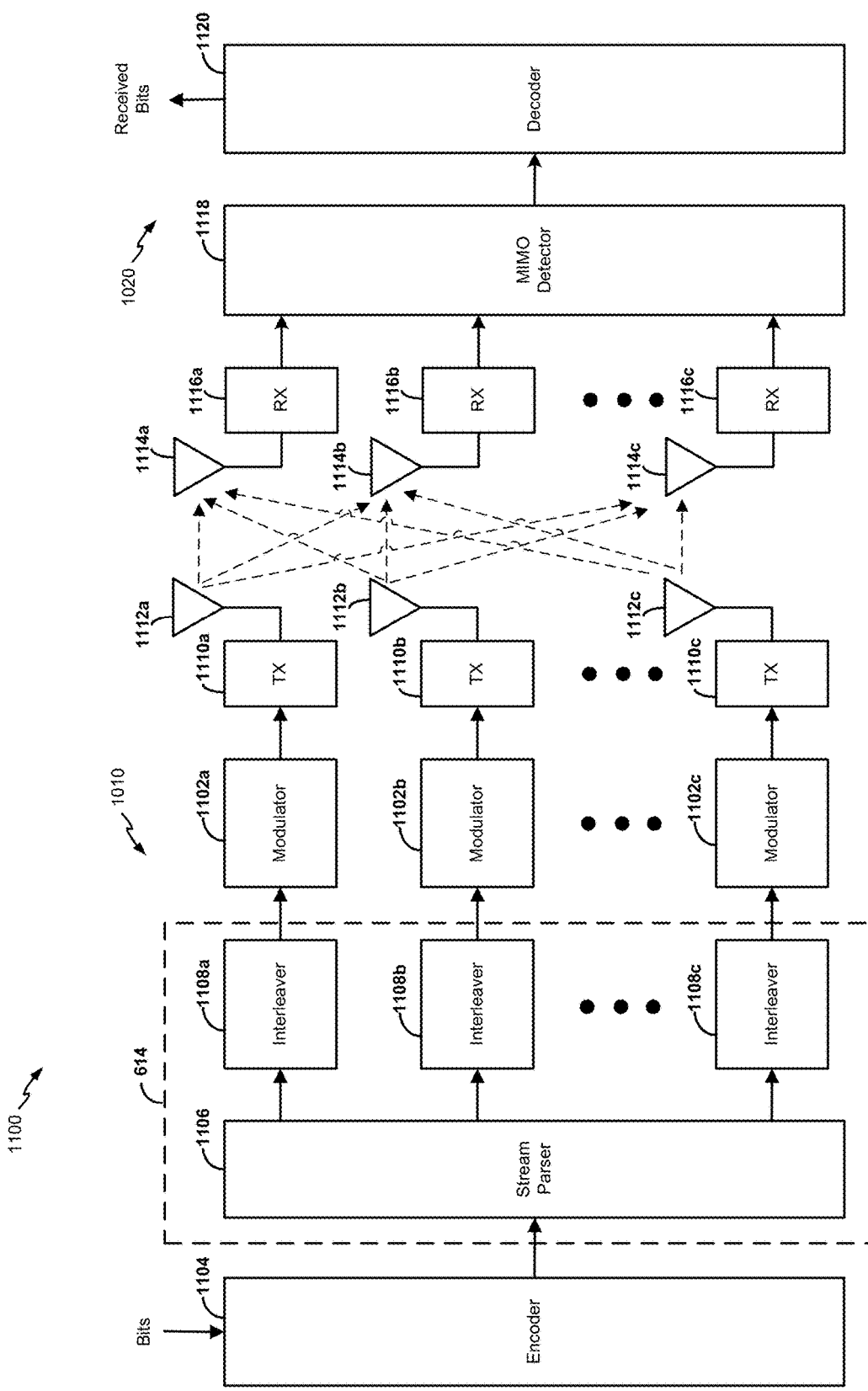
FIG. 11 shows an example multiple-input-multiple-output (MIMO) system that can be implemented in wireless devices, such as the wireless device of FIG. 10, to transmit and receive wireless communications.

At block 920, the wireless device independently encodes first and second data for wireless transmission over the first and second sub-bands, respectively. For example, the AP 104 can independently encode each sub-band 805A and 805C using separate encoders 1104 (FIG. 11). As another example, the STA 106A can independently encode one or more of the sub-band 805A and 805C using separate encoders 1104 (FIG. 11). In various aspects, means for encoding can include the encoder 1104.

At block 930, the wireless device transmits the independently encoded first and second data over the first and second sub-bands, respectively. For example, the AP 104 can transmit each sub-band 805A and 805C to STAs 106A and 106C, respectively. As another example, the STA 106A can transmit one or more of the sub-band 805A and 805C to the AP 104. In various aspects, means for transmitting can include the transmitter 210 (FIG. 2).

As discussed above, in various embodiments, the sub-bands of the channel can be contiguous or non-contiguous. For non-contiguous channel bonding (meaning there is a null/nulls in the whole transmission bandwidth), different tone plans can be used for different sub-bands. Accordingly, in an embodiment, separate resource allocation can be performed for each sub-band. Moreover, in an embodiment, each sub-band can transmit independent PPDUs using FDMA/OFDMA.

For contiguous channel bonding (meaning the whole transmission is contiguous), multiple RUs can be allocated to the same user. Accordingly, in an embodiment, each RU can be independently encoded. Multiple RUs assigned to the same user can be either contiguous or non-contiguous within an otherwise contiguous sub-band.

In various embodiments, each allocation in each of the sub-bands can include any combination of 20-, 52-, 106-, and 242-tone blocks. In various embodiments, the plurality of sub-bands can be contiguous. In various embodiments, at least two non-contiguous tone blocks within the plurality of sub-bands can be allocated for the same wireless device.

In various embodiments, the plurality of sub-bands can be non-contiguous. In various embodiments, each sub-band can have a resource allocation separate from other sub-bands of the plurality of sub-bands. In various embodiments, the method can further include performing a separate fast Fourier transform (FFT) on each sub-band. In various embodiments, each sub-band can include a separate physical layer data unit (PPDU) from other sub-bands of the plurality of sub-bands.

In various embodiments, the method can further include choosing a combination of non-contiguous sub-bands from two options. Choosing between two options can advantageously reduce the number of non-contiguous modes. In various embodiments, the non-contiguous sub-bands can be limited to be separated by a null sub-band. In various embodiments, the sub-bands can include a single-user downlink transmission can include a combination of 802.11ax PPDUs.

In various embodiments, the sub-bands can include a single-user uplink transmission can include a combination of 802.11ax and/or 802.11ac PPDUs. In various embodiments, wherein the sub-bands can include a downlink orthogonal frequency-division multiple access (OFDMA) transmission can include a combination of two 802.11ax or 802.11ax plus legacy transmissions. In various embodiments, wherein the sub-bands can include an uplink orthogonal frequency-division multiple access (OFDMA) transmission can include a combination of two 802.11ax or 802.11ax plus legacy transmissions.

In various embodiments, the plurality of sub-bands can be a strict subset of sub-bands of the channel, the method can further include puncturing a tone plan for a null sub-band of the channel without regard for a sub-band boundary next to the null sub-band. In various embodiments, the plurality of sub-bands can be a strict subset of sub-bands of the channel, the method can further include creating a guard band by puncturing one or more data tones next to a null sub-band of the channel such that sub-band boundaries can be respected. In various embodiments, the null sub-band can be adjacent to a set of direct current (DC) tones for the channel, the method can further include puncturing only one half of a 26-tone allocation unit. In various embodiments, the null sub-band can be not adjacent to a set of direct current (DC)

tones for the channel, the method can further include puncturing an entire 26-tone allocation unit.

In various embodiments, the channel can include 80 MHz. In various embodiments, the channel can include 160 MHz. In various embodiments, the channel can include two 80 MHz segments.

In various embodiments, the method can further include disallowing single-user transmission mode. In various embodiments, the channel can include an orthogonal frequency division multiple access (OFDMA) channel. In various embodiments, the method can further include disallowing one or more 802.11 transmissions over the channel.

In various embodiments, the method can further include disallowing uplink transmissions over the channel. In various embodiments, the method can further include establishing an alternate primary channel via media access control signaling. In various embodiments, the method can further include allocating a frequency gap between two frequency division multiple access (FDMA) physical layer convergence protocol (PLCP) protocol data units (PPDUs).

Figure 10:
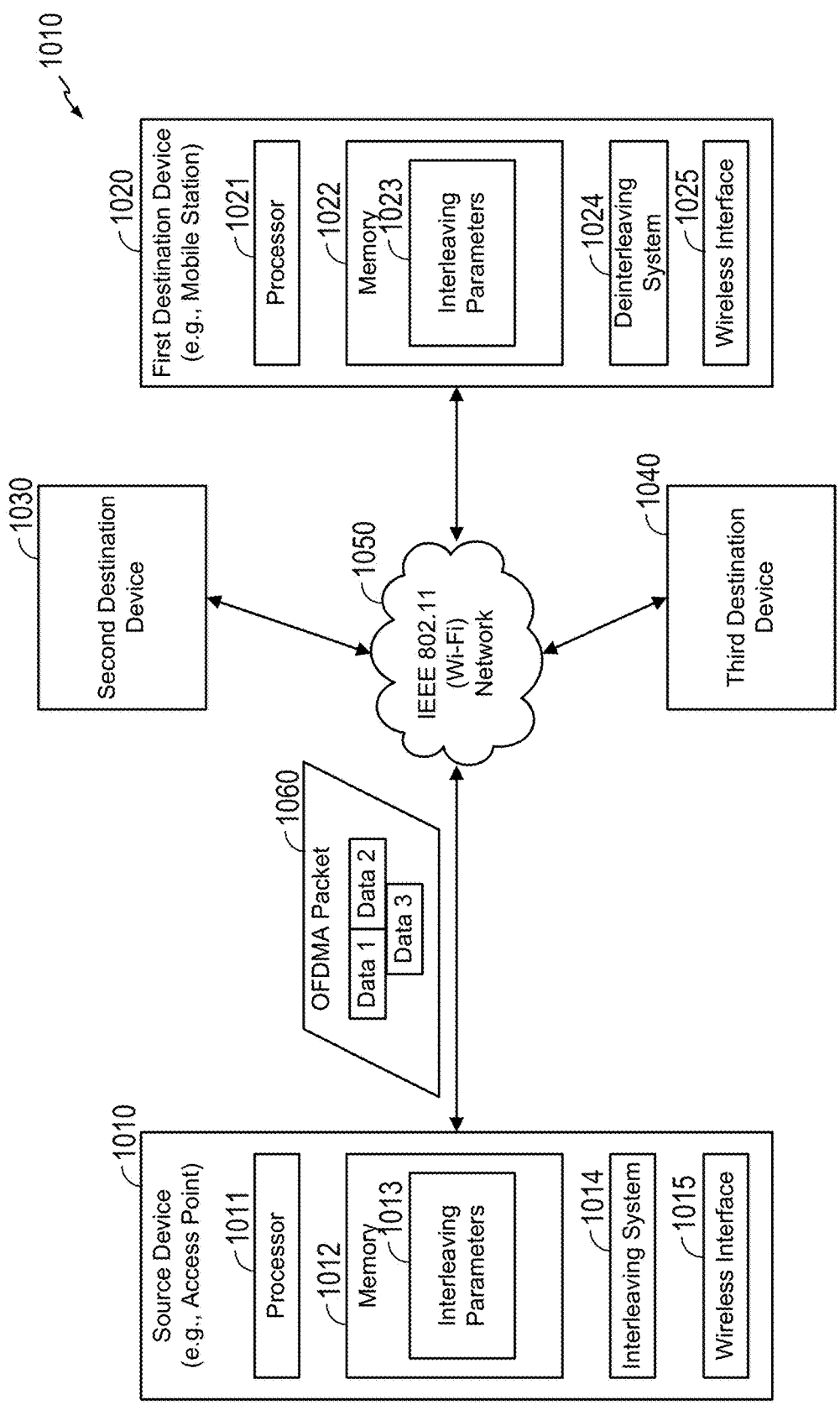
FIG. 10 shows a system that is operable to generate interleaving parameters for orthogonal frequency-division multiple access (OFDMA) tone plans, according to an embodiment.

FIG. 10 shows a system 1000 that is operable to generate interleaving parameters for orthogonal frequency-division multiple access (OFDMA) tone plans, according to an embodiment. The system 1000 includes a first device (e.g., a source device) 1010 configured to wirelessly communicate with a plurality of other devices (e.g., destination devices) 1020, 1030, and 1040 via a wireless network 1050. In alternate embodiments, a different number of source devices destination devices can be present in the system 1000. In various embodiments, the source device 1010 can include the AP 104 (FIG. 1) and the other devices 1020, 1030, and 1040 can include STAs 106 (FIG. 1). The system 1000 can include the system 100 (FIG. 1). In various embodiments, any of the devices 1010, 1020, 1030, and 1040 can include the wireless device 202 (FIG. 2).

In a particular embodiment, the wireless network 1050 is an Institute of Electrical and Electronics Engineers (IEEE) 802.11 wireless network (e.g., a Wi-Fi network). For example, the wireless network 1050 can operate in accordance with an IEEE 802.11 standard. In a particular embodiment, the wireless network 1050 supports multiple access communication. For example, the wireless network 1050 can support communication of a single packet 1060 to each of the destination devices 1020, 1030, and 1040, where the single packet 1060 includes individual data portions directed to each of the destination devices. In one example, the packet 1060 can be an OFDMA packet, as further described herein.

The source device 1010 can be an access point (AP) or other device configured to generate and transmit multiple access packet(s) to multiple destination devices. In a particular embodiment, the source device 1010 includes a processor 1011 (e.g., a central processing unit (CPU), a digital signal processor (DSP), a network processing unit (NPU), etc.), a memory 1012 (e.g., a random access memory (RAM), a read-only memory (ROM), etc.), and a wireless interface 1015 configured to send and receive data via the wireless network 1050. The memory 1012 can store binary convolutional code (BCC) interleaving parameters 1013 used by an interleaving system 1014 to interleave data according to the techniques described with respect to an interleaving system 1014 of FIG. 11.

As used herein, a "tone" can represent a frequency or set of frequencies (e.g., a frequency range) within which data can be communicated. A tone can alternately be referred to as a subcarrier. A "tone" can thus be a frequency domain unit, and a packet can span multiple tones. In contrast to tones, a "symbol" can be a time domain unit, and a packet can span (e.g., include) multiple symbols, each symbol having a particular duration. A wireless packet can thus be visualized as a two-dimensional structure that spans a frequency range (e.g., tones) and a time period (e.g., symbols).

As an example, a wireless device can receive a packet via a 20 megahertz (MHz) wireless channel (e.g., a channel having 20 MHz bandwidth). The wireless device can perform a 256-point fast Fourier transform (FFT) to determine 256 tones in the packet. A strict subset of the tones can be considered "useable" and the remaining tones can be considered "unusable" (e.g., can be guard tones, direct current (DC) tones, etc.). To illustrate, 238 of the 256 tones can be useable, which may include a number of data tones and pilot tones.

In a particular embodiment, the interleaving parameters 1013 can be used by the interleaving system 1014 during generation of the multiple access packet 1060 to determine which data tones of the packet 1060 can be assigned to individual destination devices. For example, the packet 1060 can include distinct sets of tones allocated to each individual destination device 1020, 1030, and 1040. To illustrate, the packet 1060 can utilize interleaved tone allocation.

The destination devices 1020, 1030, and 1040 can each include a processor (e.g., a processor 1021), a memory (e.g., a memory 1022), and a wireless interface (e.g., a wireless interface 1025). The destination devices 1020, 1030, and 1040 can also each include a deinterleaving system 1024 configured to deinterleave packets (e.g., single access packets or multiple access packets), as described with reference to a MIMO detector 1118 of FIG. 11. In one example, the memory 1022 can store interleaving parameters 1023 identical to the interleaving parameters 1013.

During operation, the source device 1010 can generate and transmit the packet 1060 to each of the destination devices 1020, 1030, and 1040 via the wireless network 1050. The packet 1060 can include distinct sets of data tones that can be allocated to each individual destination device according to an interleaved pattern.

The system 1000 of FIG. 10 can thus provide OFDMA data tone interleaving parameters for use by source devices and destination devices to communicate over an IEEE 802.11 wireless network. For example, the interleaving parameters 1013, 1023 (or portions thereof) can be stored in a memory of the source and destination devices, as shown, can be standardized by a wireless standard (e.g., an IEEE 802.11 standard), etc. It should be noted that various data tone plans described herein can be applicable for both downlink (DL) as well as uplink (UL) OFDMA communication.

For example, the source device 1010 (e.g., an access point) can receive signal(s) via the wireless network 1050. The signal(s) can correspond to an uplink packet. In the packet, distinct sets of tones can be allocated to, and carry uplink data transmitted by, each of the destination devices (e.g., mobile stations) 1020, 1030, and 1040.

FIG. 11 shows an example multiple-input-multiple-output (MIMO) system 1100 that can be implemented in wireless devices, such as the wireless device of FIG. 10, to transmit and receive wireless communications. The system 1100 includes the first device 1010 of FIG. 10 and the destination device 1020 of FIG. 10.

The first device 1010 includes an encoder 1104, the interleaving system 1014, a plurality of modulators 1102a-1102c, a plurality of transmission (TX) circuits 1110a-1110c, and a plurality of antennas 1112a-1112c. The destination device 1020 includes a plurality of antennas 1114a-

1114c, a plurality of receive (RX) circuits 1116a-1116c, a MIMO detector 1118, and a decoder 1120.

A bit sequence can be provided to the encoder 1104. The encoder 1104 can be configured to encode the bit sequence. For example, the encoder 1104 can be configured to apply a forward error correcting (FEC) code to the bit sequence. The FEC code can be a block code, a convolutional code (e.g., a binary convolutional code), etc. The encoded bit sequence can be provided to the interleaving system 1014.

The interleaving system 1014 can include a stream parser 1106 and a plurality of spatial stream interleavers 1108a-1108c. The stream parser 1106 can be configured to parse the encoded bit stream from the encoder 1104 to the plurality of spatial stream interleavers 1108a-1108c.

Each interleaver 1108a-1108c can be configured to perform frequency interleaving. For example, the stream parser 1106 can output blocks of coded bits per symbol for each spatial stream. Each block can be interleaved by a corresponding interleaver 1108a-1108c that writes to rows and reads out columns. The number of columns (Ncol), or the interleaver depth, can be based on the number of data tones (Ndata). The number of rows (Nrow) can be a function of the number of columns (Ncol) and the number of data tones (Ndata). For example, the number of rows (Nrow) can be equal to the number of data tones (Ndata) divided by the number of columns (Ncol) (e.g., Nrow=Ndata/Ncol).

Legacy Multiplexing

In various embodiments, for the 80, 160, and 80+80 MHz BSS BW embodiments discussed above, FDMA can be multiplexed with legacy transmissions (for example, according to any existing 802.11 standard). In some embodiments, legacy modes can be limited, for example by disallowing one or more multiplexed 802.11 transmissions. For example, multiplexing can be allowed with 802.11a only, 802.11a/802.11n only, etc.

In another embodiment, the 80, 160, and 80+80 MHz BSS BW embodiments discussed herein can be limited to DL transmissions only. For example, non-contiguous and/or fractional UL transmissions can be disallowed, or the AP 104 can refrain from allocating such configurations. In some embodiments, MAC signaling can be used to establish an alternate primary channel for 802.11ax or HEW stations.

In some embodiments, a frequency gap can be established to separate two FDMA PPDUs. One such frequency gap is shown in FIG. 13.

Figure 13:
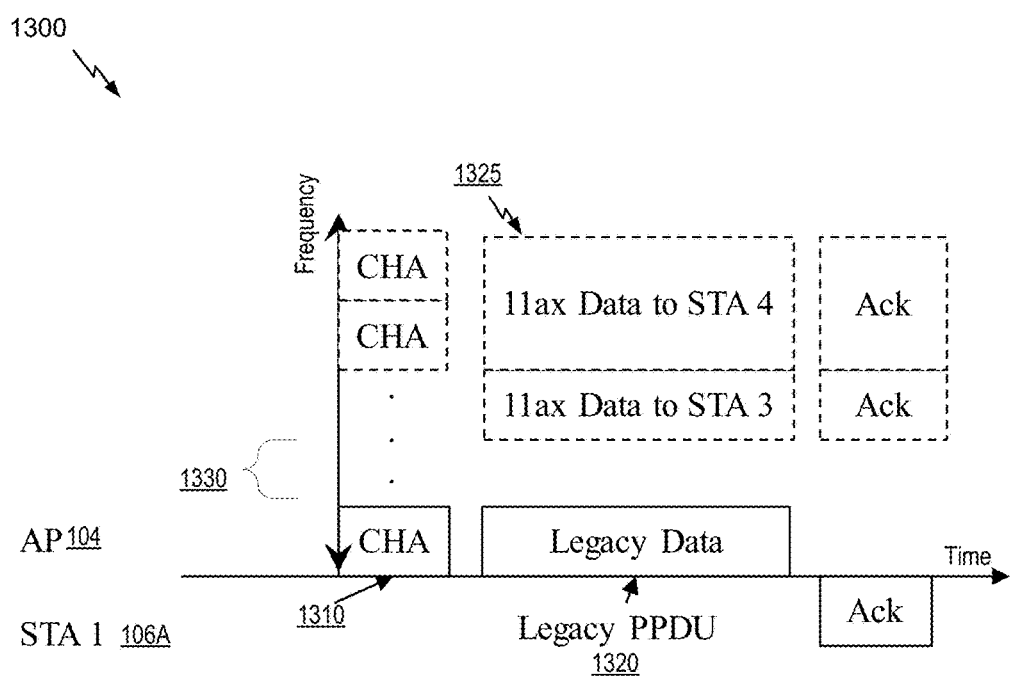
FIG. 13 shows a time-frequency graph having a frequency gap separating two transmissions and, according to an embodiment.

FIG. 13 shows a time-frequency graph 1300 having a frequency gap 1330 separating two transmissions 1320 and 1325, according to an embodiment. As shown in FIG. 13, a plurality of channels 1310 include a frequency gap 1330. The frequency gap 1330 separates a legacy PPDU 1320 from HEW transmissions 1325.

Implementing Technology

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations.

Certain features that can be described in this specification in the context of separate implementations also can be implemented in combination in a single implementation. Conversely, various features that can be described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave can be included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise non-transitory computer readable medium (e.g., tangible media). In addition, in some aspects computer readable medium can comprise transitory computer readable medium (e.g., a signal). Combinations of the above should also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. A communication device configured to communicate over a wireless communication network, comprising:
   a processor configured to:
     allocate, or receive allocation of, at least a portion of a first sub-band of a channel and at least a portion of a second sub-band of the channel for use by the communication device, wherein the channel further comprises at least one null sub-band; and
     create a guard band, between the at least one null sub-band and the first sub-band or the second sub-band, by puncturing one or more data tones next to the at least one null sub-band such that sub-band boundaries are maintained;
   a plurality of encoders configured to independently encode first and second data for wireless transmission over the first sub-band and the second sub-band, respectively; and
   a transmitter configured to transmit the independently encoded first and second data over the first sub-band and the second sub-band, respectively.

2. The apparatus of claim 1, wherein the first sub-band comprises a plurality of tone blocks each including 26, 52, 106, or 242 tones.

3. The apparatus of claim 2, wherein the communication device is allocated a first tone block of the plurality of tone blocks in the first sub-band, and a second communication device is allocated a second tone block of the plurality of tone blocks in the first sub-band.

4. The apparatus of claim 1, wherein the first sub-band is a 20 MHz, 40 MHz, 80 MHz, or 160 MHz portion of the channel, and the second sub-band is a 20 MHz, 40 MHz, 80 MHz, or 160 MHz portion of the channel.

5. The apparatus of claim 1, wherein the first sub-band is non-contiguous with the second sub-band in the channel.

6. The apparatus of claim 1, wherein the first sub-band has a different resource allocation from the second sub-band.

7. The apparatus of claim 6, further comprising a plurality of fast Fourier transform (FFT) units configured to separately perform FFT on the first and second sub-bands.

8. The apparatus of claim 1, wherein the first sub-band is contiguous with the second sub-band, and wherein the transmission on the first sub-band comprises a separate physical layer data unit (PPDU) from the transmission on the second sub-band.

9. The apparatus of claim 1, wherein the first sub-band is non-contiguous with the second sub-band, and wherein the processor is further configured to choose a combination of non-contiguous sub-bands from two options.

10. The apparatus of claim 1, wherein the first sub-band is separated from the second sub-band by the at least one null sub-band.

11. The apparatus of claim 1, wherein the first sub-band is contiguous with the second sub-band, and wherein the first and second sub-bands together comprise a single-user uplink or downlink transmission including a combination of 802.11ax physical layer data units (PPDUs).

12. The apparatus of claim 1, wherein the first sub-band is contiguous with the second sub-band, and wherein the first and second sub-bands together comprise an uplink or downlink orthogonal frequency-division multiple access (OFDMA) transmission comprises a combination of two 802.11ax or 802.11ax plus legacy transmissions.

13. The apparatus of claim 1, wherein the null sub-band is adjacent to a set of direct current (DC) tones for the channel, wherein the processor is further configured to puncture only one half of a 26-tone allocation unit.

14. The apparatus of claim 1, wherein the null sub-band is not adjacent to a set of direct current (DC) tones for the channel, wherein the processor is further configured to puncture an entire 26-tone allocation unit.

15. The apparatus of claim 1, wherein the first sub-band comprises a first 80 MHz segment, and the second sub-band comprises a second 80 MHz segment.

16. The apparatus of claim 1, wherein the processor is configured to establish an alternate primary channel via media access control signaling during transmission of the independently encoded first and second data.

17. The apparatus of claim 1, wherein the processor is further configured to allocate a frequency gap between two frequency division multiple access (FDMA) physical layer convergence protocol (PLCP) protocol data units (PPDUs) during transmission of the independently encoded first and second data.

18. A method of communicating over a wireless communication network, comprising:
   allocating, or receiving allocation of, at least a portion of a first sub-band of a channel and at least a portion of a second sub-band of the channel for use by a communication device, wherein the channel further comprises at least one null sub-band;
   creating a guard band, between the at least one null sub-band and the first sub-band or the second sub-band by puncturing one or more data tones next to the at least one null sub-band such that sub-band boundaries are maintained;

independently encoding first and second data for wireless transmission over the first sub-band and the second sub-band, respectively; and transmitting the independently encoded first and second data over the first sub-band and the second sub-band, respectively.

19. The method of claim 18, wherein the first sub-band comprises a plurality of tone blocks each including 26, 52, 106, or 242 tones.

20. The method of claim 19, wherein the communication device is allocated a first tone block of the plurality of tone blocks in the first sub-band, and a second communication device is allocated a second tone block of the plurality of tone blocks in the first sub-band.

21. The method of claim 18, wherein the first sub-band is a 20 MHz, 40 MHz, 80 MHz, or 160 MHz portion of the channel, and the second sub-band is a 20 MHz, 40 MHz, 80 MHz, or 160 MHz portion of the channel.

22. The method of claim 18, wherein the first sub-band is non-contiguous with the second sub-band in the channel.

23. The method of claim 18, wherein the first sub-band has a different resource allocation from the second sub-band.

24. The method of claim 23, further comprising separately performing a Fast Fourier Transform on the first and second sub-band.

25. The method of claim 18, wherein the first sub-band is contiguous with the second sub-band, and wherein the transmission on the first sub-band comprises a separate physical layer data unit (PPDU) from the transmission on the second sub-band.

26. A non-transitory computer readable medium comprising code that, when executed, causes an apparatus to:

allocate, or receive allocation of, at least a portion of a first sub-band of a channel and at least a portion of a second sub-band of the channel for use by a communication device, wherein the channel further comprises at least one null sub-band;

create a guard band, between the at least one null sub-band and the first sub-band or the second sub-band, by puncturing one or more data tones next to the at least one null sub-band such that sub-band boundaries are maintained;

independently encode first and second data for wireless transmission over the first sub-band and the second sub-band, respectively; and transmit the independently encoded first and second data over the first sub-band and the second sub-band, respectively.

* * * * *